March 20, 1962 H. H. CARY ET AL 3,025,746
SPECTROPHOTOMETER
Filed Feb. 23, 1954 5 Sheets-Sheet 1
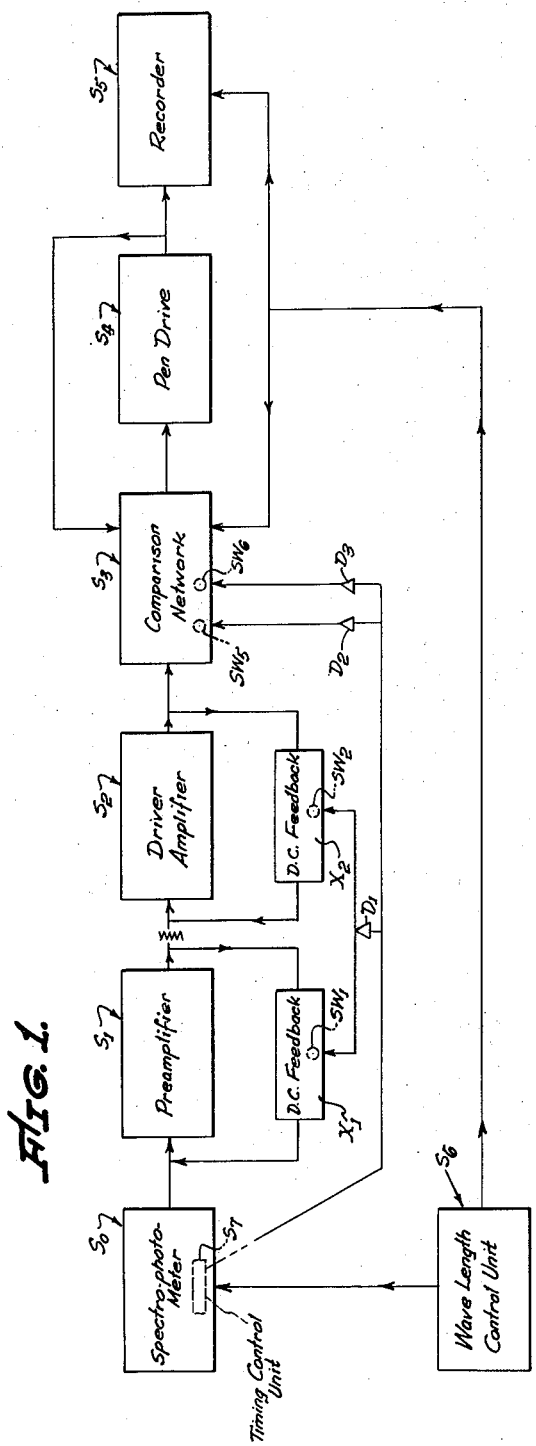
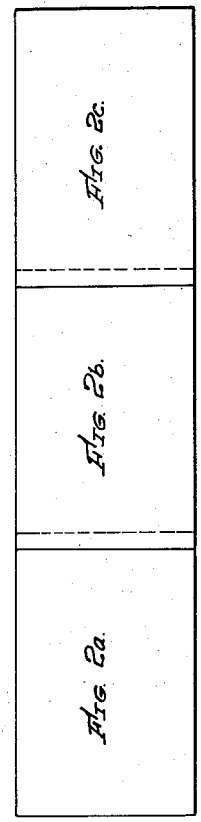
HENRY H. CARY,
ROLAND C. HAWES,
INVENTORS.
BY
ATTORNEY.

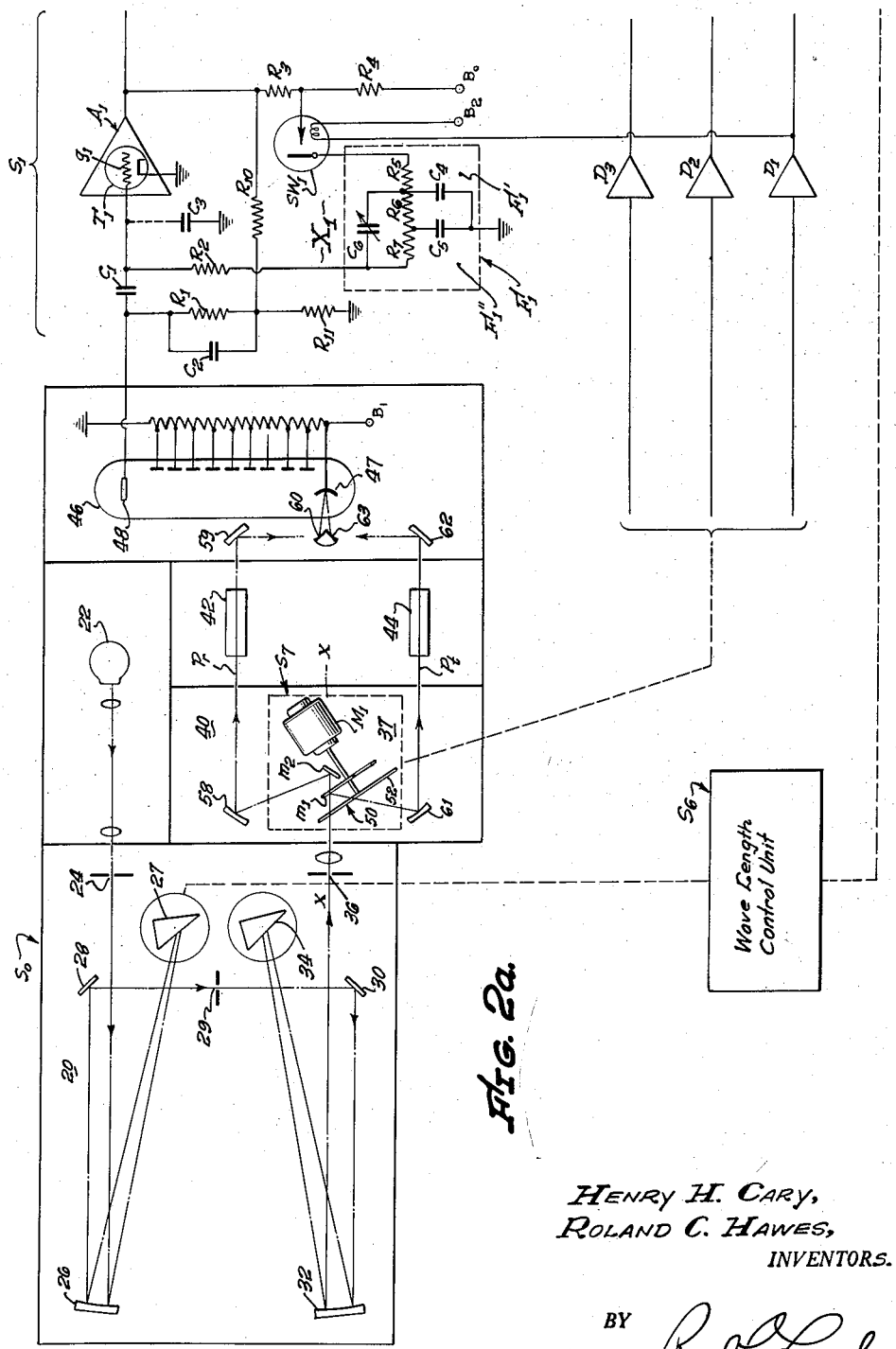

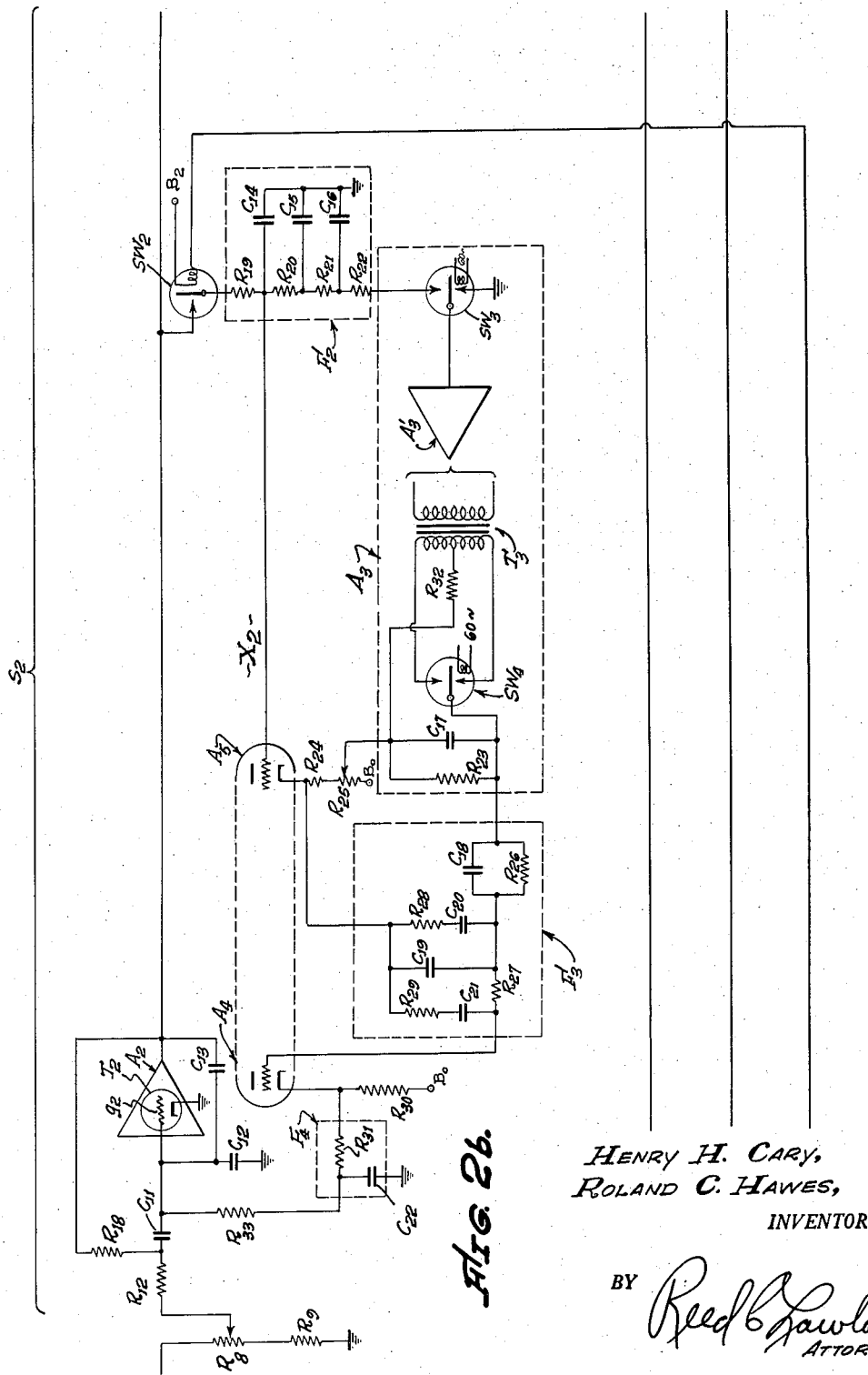

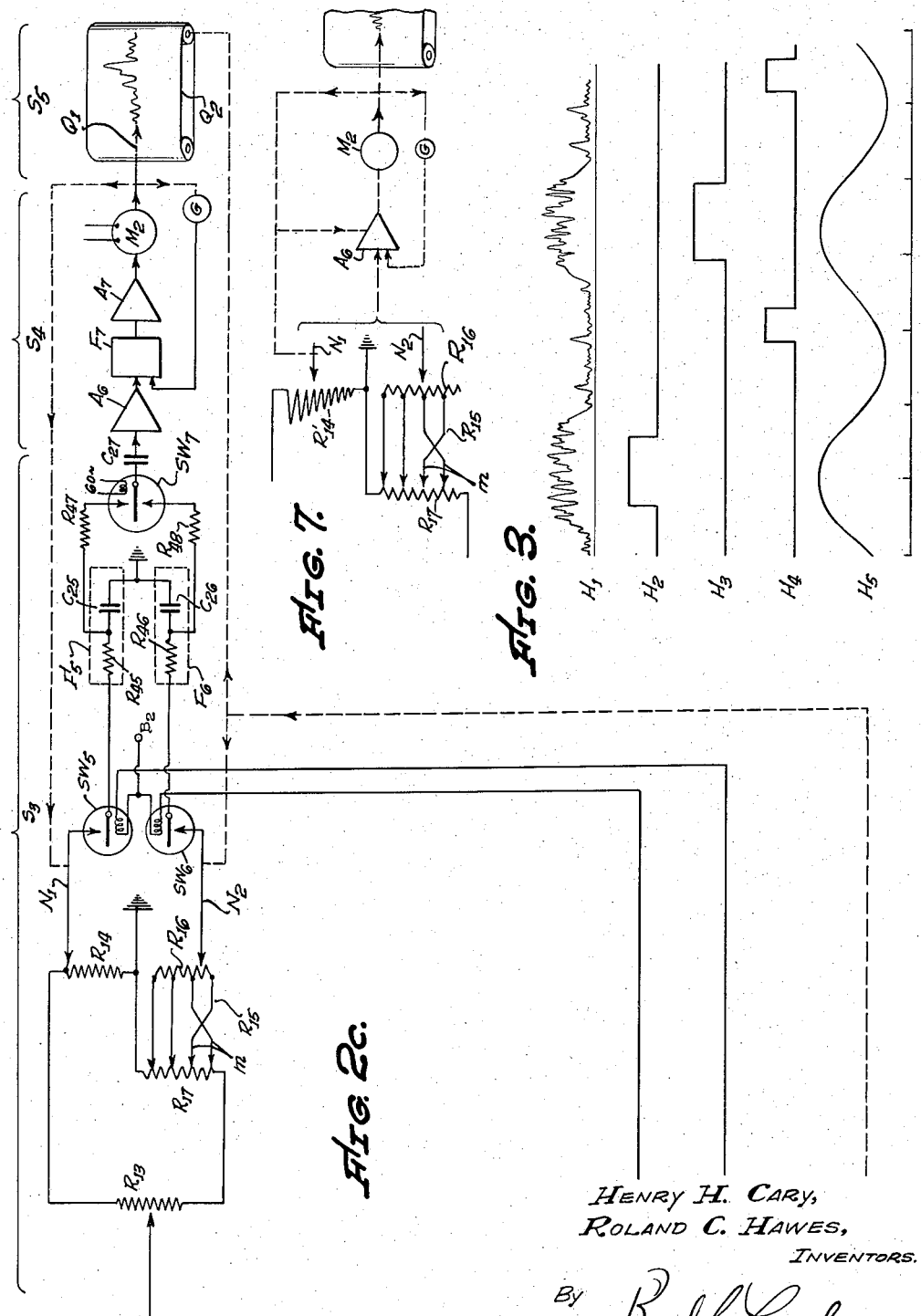

March 20, 1962  H. H. CARY ET AL  3,025,746
SPECTROPHOTOMETER
Filed Feb. 23, 1954  5 Sheets-Sheet 5
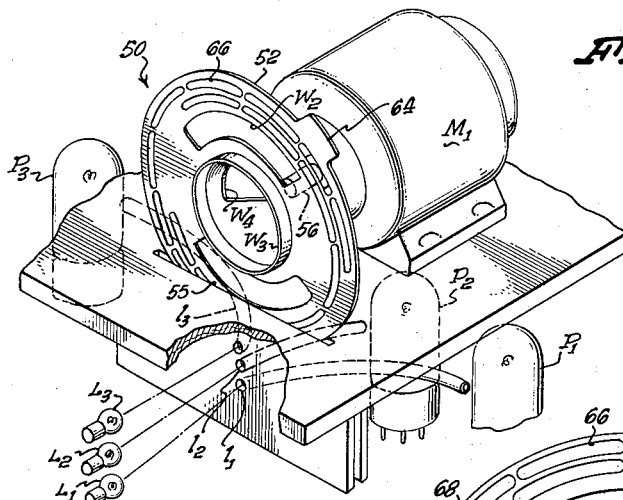
HENRY H. CARY,
ROLAND C. HAWES,
INVENTORS.
BY
*Reed B. Lawlor*
ATTORNEY.

3,025,746
SPECTROPHOTOMETER

Henry H. Cary, Alhambra, and Roland C. Hawes, Monrovia, Calif., assignors to Applied Physics Corporation, Monrovia, Calif., a corporation of California
Filed Feb. 23, 1954, Ser. No. 411,794
17 Claims. (Cl. 88—14)

The present invention relates to spectrophotometry and more particularly to improvements in methods and apparatus employed for measuring the transmission coefficients, reflection coefficients, and emission coefficients or other radiation, or optical coefficients of samples in various portions of the spectrum, and more particularly, to methods and apparatus for comparing such coefficients in different samples. Although the invention is applicable to the measurement of other physical characteristics of samples, it will be described in detail hereinafter with particular reference to the determination of the transmission coefficient spectrum of a sample.

Part 1.—Introduction

In many spectrophotometers, the transmission coefficients of samples at different wavelengths are determined by dispersing white light into its spectral components and passing various monochromatic components of the radiation, one at a time, through the sample being tested. The transmission coefficient may be measured by transmitting the radiation through the sample onto a photosensitive surface or element of a photocell and comparing the current produced by the photocell with the current that would be produced by transmitting the light directly to the photocell in the absence of the sample.

In some arrangements radiation is passed through a reference sample and a test sample and a comparison is made of the intensity of the radiation after passage through the respective samples. In the past, radiation passing through a reference sample and a test sample has sometimes been transmitted to two separate phototubes and the intensities of the radiation striking the respective phototubes have been compared by comparing the currents produced by the two photocells. This arrangement suffers from the inherent disadvantage that the characteristics of the two photocells vary with time, either as a result of gradual aging which may cause different drifts in the sensitivity of the different photocells, or because of differences in the spontaneous random fluctuations in the characteristics of the photocells.

To eliminate such defects, spectrophotometers have been constructed in which radiation is transmitted from a common source through the reference sample and through the test sample alternately to a single common photocell. In such a system a comparison is made of the currents produced by the photocell at different times corresponding to the times of transmission of light thereto through the reference and test samples respectively.

A single-photocell spectrophotometer of the type just mentioned which is sometimes referred to as a "flicker beam" spectrophotometer, and which employs a system for measuring the ratio of the photocell currents produced by radiation transmitted through the reference and test samples respectively to a common photocell, has been described in an article by D. F. Hornig, G. E. Hyde, and W. A. Adcock, and published in the August 1950 Journal of the Optical Society. In that system the transmission of radiation to the photocell is accomplished by means of a shutter which causes two series of separate pulses of light to pass alternately through the reference sample and through the test sample to the photocell. The two series of current pulses that are produced by the photocell are sorted electrically and their amplitudes are compared in a ratio measuring circuit in order to determine the transmission coefficient. The present invention constitutes an improvement over the Hornig et al. system, as well as over other prior systems of spectrophotometry.

Errors have arisen in measurements made with prior systems of spectrophotometry, such as those of the flicker-beam type, because of the presence of "noise," or random fluctuations, in signal strength that occurs in various parts of the system such as in the monochromatic radiation itself, in the photocells, and in the amplifiers that are employed for measuring the electrical current produced by the photocells. More particularly, when the intensity of the radiation striking the photocell is as low as 10,000 photons/sec. at the wavelength at which measurements are being made, considerable random fluctuation occurs in the intensity of the radiation itself due solely to the corpuscular nature of light and the random character of the emission of the quanta of light from the source of light. Furthermore, when a photocell in the form of a multiplier phototube is employed to detect the radiation transmitted thereto through a spectrophotometer, considerable noise occurs because of the random fluctuations in thermionic current emitted by the photocathode of the photocell. The magnitude of this noise increases somewhat with the voltage applied to the dynode system of the phototube. More particularly, when a relatively quiet phototube of the IP28 type, that is one which is relatively free of noise when in the dark, is employed at room temperature, then when no light is being directed to the phototube the random current from the photocathode may average about 1,000 electrons/sec. and when radiation amounting to about 10,000 photons/sec. are impinging upon the photocathode, thereby producing a signal of about .2500 electrons/sec., the total photocathode current is the sum of these values, being in this case about 3500 electrons/sec. The amount of noise caused by the photocell is even greater where a lead sulphide photoelectric element is employed to detect infrared radiation. The actual figures that apply in any particular case depend to a large extent upon the sensitivity of the photocathode to radiation of the particular wavelength that is striking the photocathode at the time and the quality and nature of the phototube. In any event, however, it is to be noted that considerable noise is present.

Other sources of noise include the input resistor of the amplifier that is connected to the phototube and also the grid and cathode of the tubes employed, especially the input amplifier tube. In the embodiment of the invention illustrated herein, noise from these two sources is made negligible for the amplitude of signal at the output of the amplifier. Since that amplitude is proportional to the product of the multiplication factor of the phototube and the amplification factor of the amplifier, the latter factor is made as low as possible consistent with adequate sensitivity. For example, the thermal agitation noise in a 1 c.p.s. passband from a 100 megohm phototube load resistor, at room temperature, is about 1.3 microvolts. In order to avoid interference from this source of noise, a signal is employed across the phototube load resistor of at least about 1.7 microvolts. Such a signal is produced without serious loss of sensitivity by taking advantage of the large internal amplification of the current emitted from the photocathode by secondary emission from the dynodes of the phototube.

In spectrophotometry, it is desirable to maintain the sensitivity of the phototube as high as possible, while still maintaining adequate accuracy of the measurements being made. If a measurement accuracy of 0.1% is required at large transmission or reflection values, of almost 100%, a photocathode current of about 250,000 electrons/sec. is required, in order to maintain a signal-to-noise ratio consistent with such accuracy, while if an accuracy of 1% is tolerable, a photocurrent of only about 2,000 electrons/sec. suffices, under typical operating conditions where the band width of the measuring system is about 1 c.p.s. If accuracy can be sacrificed the resolving power can be increased.

In spectrophotometry, where the resolving power is high, the total amount of illumination falling upon the photocathode may be as little as 10,000 photons/sec. even when the transmission coefficient of the sample being tested is 100%. It is thus apparent that when the transmission coefficient is as low as 1%, it becomes extremely difficult to make any accurate measurements at all because, as the intensity of the illumination is reduced to a corresponding value of about 100 photons/sec., the signal-to-noise ratio falls. Though the signal-to-noise ratio may be increased by reducing the resolving power as by opening the exit slit of the monochromator or by increasing the intensity of radiation from the source, this is sometimes undesirable.

When the intensity of the illumination is substantial as when the transmission coefficient is fairly large, it is not a very difficult problem to measure the intensity of the signal provided that a system is employed for making the measurements which does not respond rapidly. This is because the signal-to-noise ratio varies inversely as the square root of the width of the band of alternating current frequencies that affect the measuring instrument. Thus, if the measuring instrument is permitted a very long time, such as several minutes, in which to respond to the signal and therefore to filter, or average, out the noise, an accurate measurement of the intensity of the radiation may be obtained. However, in this case the rate at which a spectrum may be scanned is severely limited. In order to attain suitable scanning speeds, we use a comparatively fast system response, with a natural period of one second, but approximately critically damped, in order to assist in discriminating against noise. This system has an effective band width for noise of 0.79 cycle per second.

Another difficulty encountered in spectrophotometry, especially systems of the flicker-beam type, arises from the fact that the "zero-level" of the system is continuously drifting because of both regular and irregular variations in the emission of various amplifier tubes and of the phototube, and sometimes because of random background radiation that may be reaching the photocell. Such variations of emission appear in the form of gradual changes in the drift, that is, a shift in the zero level. Where such changes in drift occur while successive pulses in the different series are being measured, the amplitudes of the pulses cannot be accurately measured and compared.

Having in mind the foregoing problems, it is the object of the present invention to provide an improved system of spectrophotometry in which the effective overall signal-to-noise ratio is increased and in which the effect of drift of the output signal is greatly reduced while still maintaining high scanning speed and high sensitivity.

According to this invention shift of zero level is reduced by sampling the noise that exists in the output of the amplifier system during the dark intervals, that is the intervals between successive pulses, and by employing the samples so obtained to control the bias at the input tube of the amplifier so as to maintain the zero level nearly zero within narrow limits. Also, according to the present invention the two series of pulses are segregated and then compared in a recording system and the high-frequency components of noise that would otherwise mask or seriously interfere with the measurement of the signals are filtered out by the recording system. In this way accurate measurements are obtained relatively free of drift and of both low and high frequency components of random disturbances. The main advantage of the present invention resides in the unusually high degree of accuracy attainable over a large range of transmission coefficient.

The foregoing and other objects of the invention together with other advantages thereof will become apparent from the following specification taken in connection with the accompanying drawings wherein one embodiment of the invention is illustrated. In the drawings:

FIG. 1 is a schematic diagram of a spectrophotometer embodying the invention;

FIG. 2 is a diagram showing how FIGS. 2a, 2b and 2c are assembled to form a more complete wiring diagram, FIGS. 2a, 2b and 2c showing certain parts of the spectrophotometer in more detail;

FIG. 3 is a series of graphs employed in explaining the operation of the invention;

FIG. 4 is a fragmentary perspective view of the beam director;

FIG. 5 is an end view of the beam director;

FIG. 6 is a longitudinal view partly in section of part of the beam director; and FIG. 7 is a schematic diagram of an alternative form of the measuring system.

Part 2.—General Description

A recording spectrophotometer embodying the features of the present invention is illustrated schematically in FIG. 1. This spectrophotometer comprises in general a spectrometer $S_0$, a preamplifier stage $S_1$, a driver amplifier stage $S_2$, a signal comparator stage $S_3$, a power amplifier stage $S_4$, a recording stage $S_5$, a wavelength control unit $S_6$, and a beam director and timing control unit $S_7$. All the parts are so designed and arranged that the recording stage $S_5$ makes a spectrogram showing accurately the variation of the transmission coefficient of a test sample as a function of wavelength. While the invention is described herein with particular reference to its application to a spectrophotometer that is employed for testing transparent samples, it will be understood that it may also be employed to determine the spectral reflectance characteristics of an opaque sample, and that it may even be employed merely to measure the optical density of a sample over a wide wavelength range and that it may be employed to measure other radiation or optical coefficients of samples especially those that vary with wavelength. It will, therefore, be understood that the invention is not limited to the specific embodiment thereof that is described hereinafter which is employed for producing a spectrogram showing the variation of transmission coefficient with wavelength of a transparent sample.

Part 3.—The Spectrophotometer

As shown in FIG. 1 the spectrophotometer $S_0$ here illustrated comprises a monochromator 20 including a stabilized source of radiation 22, such as an incandescent lamp that is supplied power from a regulated power source, for projecting a beam of light through an entrance slit 24 onto a curved first mirror 26 and from thence to a prism 27 and then by a return path to the same first mirror 26 and from thence to a second mirror 28 through a slit 29 to a third mirror 30 and then to a fourth mirror 32 to a second prism 34 and return to the fourth mirror 32 and thence through an exit slit 36. This arrangement constitutes a monochromator of the Littrow type. With this arrangement, monochromatic radiation of a selected wavelength is projected outwardly through the exit slit 36 by setting the prisms 27 and 34 at a suitable angle relative to the beams which are refracted and reflected by them. In practice, the prisms are arranged to be rotated about parallel vertical axes that are normal to the horizontal plane of the axis along which the beam is transmitted from the entrance slit 24 to the exit slit 36 and the two prisms are rotated in synchronism by well-known conventional methods by means of a wavelength control unit $S_6$.

Monochromatic radiation passing through the exit slit 36 along the optic axis X—X enters a sample testing unit 40 where the beam is alternately transmitted through a cell 42 that contains air or some other reference sample and a test sample cell 44 that contains a sample of transparent material that is to be tested. The beams of light that have passed through the two cells 42 and 44 are then directed to a common photocell such as a multiplier phototube 46, where they alternately excite the photosensitive element 48 thereof.

In the particular testing unit 40 illustrated, the monochromatic beam 37 from the exit slit 36 strikes a beam director 50 comprising a rotating mirror and a shutter driven by a four-pole synchronous motor $M_1$ and which serves to transmit the beam to the photocell 46 alternately along two paths that are parallel to the optic axis X—X. One path passes through the reference cell 42 and the other passes through the sample cell 44. The beam director 50 also acts as light chopper and a timing control unit.

As shown in more detail in FIGS. 4, 5, and 6, the beam director 50 comprises a chopper disc 52 and a chopper disc hub 54 that are mounted on the shaft 56 of the synchronous motor $M_1$. The chopper disc is provided with two 90° or quadrant windows, namely a reference sample window $W_1$ and a test sample window $W_2$, that are diametrically opposed and a central circular window $W_3$. The chopper disc hub 54 is provided with a 180° or semicircular window $W_4$. A flat mirror $m_1$ extends upwardly from the hub in a plane perpendicular to the shaft of the motor $M_1$. The center of the mirror $m_1$ is located directly behind the test sample window $W_2$.

As the motor $M_1$ rotates, the beam is alternately intercepted by the opaque 90° or quadrant sectors 53 that separate the windows $W_1$ and $W_2$ and alternately permit the light to be transmitted through the test window $W_2$ and the reference window $W_1$. When radiation is being transmitted through the reference window $W_1$, it passes beyond the edge of the hub 54 and strikes a stationary mirror $m_2$ which reflects the monochromatic beam of light along a path which extends through the reference cell 42 to the photocell 46 but when radiation is being transmitted through the test sample window $W_2$, it strikes the hub mirror $m_1$ and is reflected along a path that extends through the semi-circular window $W_4$, then through the central circular window $W_3$ and along a path which passes through the test cell 44. The axis of the motor lies at an angle of 40° to the direction of travel of the monochromatic beam that enters the testing unit 40 from the monochromator 20 and the planes of the two mirrors $m_1$ and $m_2$ are so arranged that the two paths along which the beam of light travels to the photocell 46 through the two reference cells 42 and 44 are of the same length and are parallel. Toric mirrors are employed to direct the beams along the two paths mentioned to the photosensitive element 48. Various features of the testing unit 40 are described in more detail and are claimed in co-pending patent application, Serial No. 411,650, filed February 23, 1954, by H. Howard Cary.

From the foregoing description of the timing unit 50, it will be noted that in each cycle of operation, or each revolution, of the motor, a pulse of light $P_r$ is transmitted through the reference cell 42 to the photocell 46 and that another pulse of light $P_t$ is transmitted through the test cell 44 to the photocell. It will be noted that because of the finite size of the beam passing through the chopper disc 52, both the front and terminal ends of the pulses change gradually as indicated by the slope at the two edges of the pulses of Graph $H_1$ of FIG. 3. In the spectrophotometer described herein, the beam is made smaller than the windows $W_1$ and $W_2$ in the manner explained in said co-pending application so that the light pulses are more or less of trapezoidal configuration as shown in FIG. 3, gradually increasing in intensity at the front end and gradually decreasing in intensity at the rear end.

Thus, two series of separate alternate pulses of radiation strike the photocell 46, the average amplitude of the pulses of one series representing the amount of light traveling through the reference cell 42 and the amplitude of the pulses of the other series representing the amount of light traveling through the test cell 44. The successive pulses are separated by dark intervals in which no light at all except possibly a small amount of random stray light is striking the photocell 46. By interrupting the light frequently, variations of the relative intensity of the two beams, that would otherwise be produced by variations in the source, are kept low. Since the photocell 46 contains a thermally emissive element and a preamplifier stage $S_1$, the signal impressed upon the input of the preamplifier stage may contain noise components from these sources and also because of random stray light both in the dark intervals and in the light pulse intervals.

In practice, the pulses of light striking the photocell 46 do not have a straight or flat top but are of irregular, noisy appearance as indicated in Graph $H_1$ of FIG. 3. More particularly, while the pulses of radiation are striking the photocell, noise is present at the input of the amplifier stage $S_1$ not only because of the thermionic emission but also because of the random or statistical variation in the intensity of the light striking the photocell because of the photonic or corpuscular nature of light. By way of example, in a particular spectrophotometer employing as a source 22 of light an incandescent lamp having a rating of 30 watts and in which the resolving power of the monochromator was 0.5 A., the radiation striking the photocell, after passing through a perfectly transparent sample, in about the middle of the visible spectrum, had an intensity corresponding to a light flux of 10,000 photons/sec. In this case a current corresponding to about 2000 electrons/sec. is produced at the photocathode of the photocell 46. In view of the fact that the duration of each light pulse interval is only $$\frac{1}{120}$$

sec., it is obvious that the amplitude of the light pulse fluctuates widely and that the amplitude of the current applied to the input of the preamplifier stage $S_1$ also fluctuates widely from this cause alone even though the transmission coefficient of the sample is constant. Superimposed upon the noise in the light pulses caused by the corpuscular nature of light, there is also present a certain amount of noise introduced by the thermionic and photoelectric action of the photocell itself. Under the particular conditions of operation described herein, this is the predominant source of noise.

Because of its electron-multiplier action the rate of emission of electrons is multiplied by a high factor, thus greatly increasing the current at the anode. In the present instance this multiplication factor is about 40,000. The noise spectrum, however, at least at the low frequencies to which the various parts of the present apparatus respond, is substantially the same at the anode as at the cathode.

From the foregoing discussion it will be apparent that it would be extremely difficult, if not impossible, to measure the amplitudes of the individual light pulses that have been transmitted through the reference and test cells and to compare their intensities with any reasonable degree of accuracy. Furthermore, it will be apparent that the random character of the noise originating in the photocell and drift arising in the amplifying system to which it is connected would cause, in effect, an erratic shift in the zero level of the pulses so that even if the amplitudes of the pulses were accurately measured, an error would occur in the computation of the ratio of the strength of the pulses because of the presence of such zero-level shift.

Certain portions of that noise and such drift are of a coherent character. For that reason, such noise, when averaged over long intervals of about 1 sec., has the same magnitude at low frequencies of about 1 c.p.s. or less both during the pulse and dark intervals which are much shorter than 1 sec. Advantage is taken of this fact in this invention by employing low frequency components of noise generated during the dark intervals to reduce the effects of low frequency components of the noise in the pulse intervals. The amplified signals still contain high frequency components of noise. These components are then filtered out by the recording system. As a result, measurements are obtained which are relatively free of errors arising from any components of such noise and drift.

The method by means of which such zero shift is substantially eliminated and by means of which the statistical variation in the intensity of the individual light pulses and the electrical pulses produced thereby because of the corpuscular nature of light is also eliminated to produce accurate measurements of transmission coefficient in accordance with this invention, is explained in detail hereinafter.

*Part 4.—Timing Control Unit*

The chopper disc 52 is provided with means for accurately controlling the time of opening and closing of a relay $SW_1$ that is located in the preamplifier stage $S_1$, a relay $SW_2$ that is located in the driver amplifier stage $S_2$ and relays $SW_5$ and $SW_6$ that are located in the comparison stage $S_3$, as more fully explained hereinafter. The relays $SW_1$, $SW_2$, $SW_5$, and $SW_6$ have normally open contacts that are closed when the relays are operated. While the timing control may be effected mechanically by means of cams and microswitches, in the particular embodiment of the invention as described herein, this control is effected by photoelectric means.

More particularly, as shown in FIGS. 4, 5, and 6, three incandescent lamps $L_1$, $L_2$, $L_3$ are arranged along a vertical line adjacent the edge of the chopper disc beneath the platform or base upon which the motor $M_1$ is mounted. To facilitate this arrangement a slot 55 is formed in the platform, through which the lower portion of the chopper disc 52 extends. The base plate and two vertical plates depending therefrom act as a light shield to prevent any excess stray light from the incandescent lamps from being transmitted to the photocell. On the opposite side of the chopper disc directly opposite each of the respective lights $L_1$, $L_2$, and $L_3$, there are mounted three light pipes $l_1$, $l_2$, and $l_3$ that lead to corresponding photoelectric cells, $P_1$, $P_2$, and $P_3$, which are respectively connected to corresponding relay control amplifiers $D_1$, $D_2$, and $D_3$. Normally, lenses and light shields (not shown) are employed to focus light from the lamps $L_1$, $L_2$, and $L_3$ on the entrances of the corresponding light pipes. Such light pipes consist of glass or Lucite rods that conduct light entering one end thereof to the other. Each of the amplifiers, $D_1$, $D_2$, and $D_3$, produces D.C. current at its output when no light strikes the corresponding photocell, thereby operating the corresponding relay and closing its contact. When light strikes any of the photocells, the D.C. current at the output of the corresponding amplifier is cut off, restoring the corresponding relay, and opening its contacts.

Two ears 64 are formed at diametrically opposite positions at the outer edge of the chopper disc 52. These ears periodically interrupt the transmission of light from the first or lowermost lamp $L_1$ to the corresponding photocell $P_1$. The ears are so located relative to the windows $W_1$ and $W_2$ that the relays $SW_1$ and $SW_2$ are restored during a short period of time near the middle of the dark interval between successive pulses $P_r$ and $P_t$.

A series of closely spaced slots 66 are arranged along a circular arc so that they permit light to be transmitted from the second or intermediate lamp $L_2$ to the corresponding photocell $P_2$. These end slots are separated by an opaque sector or mask 67 which interrupts the transmission of light from the second lamp $L_2$ to the corresponding photocell $P_2$, once in each revolution of the motor $M_1$. This arcuate mask 67 is so located relative to the windows $W_1$ and $W_2$ that the relay $SW_5$ controlled thereby, is closed only during a short interval, while each pulse of light travelling through the reference cell 42 strikes the photoelectric cell 46.

In a similar manner, light is transmitted from the third or upper lamp $L_3$ to the corresponding photocell $P_3$ through a series of arcuate slots that are separated at their near end by an opaque sector or mask 68 which periodically interrupts the transmission of light from the third lamp $L_3$ to the corresponding photocell $P_3$ once in each revolution of the motor $M_1$. The latter mask 68 is so located relative to the windows $W_1$ and $W_2$ that the relay $SW_6$ controlled thereby is closed only during a short interval while each pulse of light travelling through the test cell 44 strikes the photoelectric cell 46.

The switches $SW_1$ and $SW_2$ are employed to sample noise in the dark intervals. For this reason they are closed at a time when effects of the light pulses have fallen to a low value.

The switches $SW_5$ and $SW_6$ are employed to sample the signals produced by the light pulses. In order to insure accurate and reliable measurements these switches are closed only during a portion of the pulse intervals while the pulses are at their full values, that is when the entire beam is passing through one or the other of the windows $W_1$ or $W_2$.

It will be understood, of course, that if the lamps $L_1$, $L_2$, and $L_3$, are not arranged along a vertical line the positions of the ears 64 and the setcors 67 and 68 are so selected that the relays controlled thereby are closed at the specific times required as mentioned above.

*Part 5.—Preamplifier Stage*

The preamplifier stage $S_1$ includes a D.C. preamplifier $A_1$ having a pentode $T_1$ at its input. The pentode is of conventional type, having a cathode, a control grid, and an anode, as well as other grids. In effect, there is an input capacitor $C_3$ located at the input, due to the interelectrode capacitances and stray capacitances due to leads.

The photocathode 47 of the photocell 46 is connected to the negative terminal of an adjustable but well-regulated source of voltage $B_1$, the positive terminal of which is connected to the ground. An increase in the voltage supplied by this source increases the sensitivity, but also increases the thermionic noises. In a typical case it may be 400 volts. The anode 48 is also connected to ground through a resistor $R_1$ of very high value that is shunted by a capacitor $C_2$ through a resistor $R_{11}$ of relatively low value. Since high value resistors that are available commercially become more non-linear as the resistance value is increased, the value of the input resistor $R_1$ is set as low as possible without, however, making it so low that it produces thermal noise in excess of the noise produced by the phototube current flowing through it.

The parallel network comprising resistor $R_1$ and capacitor $C_2$ determines the upper limit of the pass band of the preamplifier stage, being set at 1200 c.p.s. in the specific example described herein. The employment of a wide frequency band preamplifier stage permits the preamplifier to respond quickly to signals applied to its input. For this reason the signals decay rapidly to a low value in the dark intervals.

The anodes of the various amplifier tubes that are arranged in the D.C. amplifier $A_1$ are supplied with voltage by connection to the positive terminal of a suitable well-regulated voltage source not shown.

A feedback resistor $R_{10}$ is connected between the output of the D.C. amplifier $A_1$ and the junction between the resistors $R_1$ and $R_{11}$.

The amplification $\mu_1$ of the D.C. amplifier $A_1$ and the feedback ratio $\beta_1$ are so chosen that the loop gain of the negative feedback circuit so formed is high, being $$\mu_1\beta_1 = 1,000 \text{ or more}$$

at frequencies above about $$f_1 = \tfrac{1}{2} \text{ c.p.s.}$$

so that the individual pulses impressed upon the input of the D.C. amplifier $A_1$ are accurately reproduced at the output thereof with an amplification factor of $$A_1 = \frac{1}{\beta_1}$$

In practice, it is only necessary for the amplification of the D.C. preamplifier stage $S_1$ to be small, provided that its output impedance is relatively low, thus permitting signals to be conducted, if desired, over long distances to the driver amplifier $S_2$. In the example described herein $A_1 = 6$ from about 0.5 c.p.s. to about 1200 c.p.s.

Besides the feedback path through resistors $R_{10}$ and $R_{11}$, the preamplifier stage $S_1$ includes an automatic bias control unit $X_1$ comprising a D.C. feedback circuit that includes a first relay $SW_1$.

In order to control the bias at the grid $g_1$ of the input pentode $T_1$ automatically, the output of the amplifier $A_1$ is connected to the negative terminal of a voltage supply $B_0$ through resistors $R_3$ and $R_4$ and the junction between resistors $R_3$ and $R_4$ is connected through normally-open contacts of the first relay $SW_1$ through filter $F_1$ and resistor $R_2$ to the control grid $g_1$. For reasons which will become apparent hereinafter, filter $F_1$ comprises two sections, $F_1'$ and $F_1''$. The first section, $F_1'$, is a low pass filter comprising a series resistor $R_5$ and a charging capacitor $C_4$. The second filter section $F_1''$ is a bridged-T filter comprising series resistors $R_6$ and $R_7$ that are connected in parallel with a bridging capacitor $C_6$, and a shunting condenser $C_5$ that is connected between the junction of resistors $R_6$ and $R_7$ and ground.

Filter section $F_1'$ feeds back only low frequency components of signals below about $\tfrac{1}{2}$ c.p.s. appearing at the output thereby reducing the gain of the preamplifier stage at such low frequency without however reducing the gain above the frequency of 15 c.p.s.

Filter $F_2$ is provided with a notch or crevice at 60 c.p.s. so that signals caused by the opening and closing of the switch $SW_1$ at 60 c.p.s will not be transmitted to the input of the preamplifier $A_1$.

The values of the resistors $R_3$ and $R_4$ are so chosen that when relay $SW_1$ is held open and no radiation is being transmitted to the photocell 46, a bias is applied to the grid $g_1$ which renders the D.C. potential appearing at the output of the amplifier $A_1$ substantially zero. For this reason, even when no signal is being applied to the input of the preamplifier stage $S_1$ from the photocell 46 except that due to thermionic emission of the photocathode, the potentiometer comprising rheostat $R_8$ and resistor $R_9$ that connects the output of the preamplifier stage $S_1$ to the input of the driver stage $S_2$ may be manipulated without applying large transient voltages to the input of the driver amplifier stage $S_2$.

The value of the resistor $R_2$, though very high, is actually low compared with the D.C. resistance existing between the cathode and the grid of the input triode $T_1$ when that pentode is biased negatively. By so selecting the constants of the circuit in such a way that substantially zero voltage appears at the output of amplifier $A_1$ when the input pentode $T_1$ is biased to a predetermined value, the feedback ratio for D.C. voltages transmitted from the output to the input of the amplifier $A_1$ through the relay $SW_1$ and the filter $F_1$ is unity. However, with the relay $SW_1$ open, the feedback ratio through that path is zero. In other words when the relay $SW_1$ is closed, fluctuations in D.C. potential that appear at the output of the amplifier $A_1$ are fed back to the input of the amplifier $A_1$ through the filter $F_1$ but when the relay $SW_1$ is open they are not fed back. Thus, as the relay $SW_1$ opens and closes periodically as explained hereinafter, the amplification of the preamplifier stage $S_1$ for D.C. signals and low frequency signals below about $\tfrac{1}{2}$ c.p.s. varies periodically, being 1 when the relay $SW_1$ is closed and $A_1$ when the relay $SW_1$ is open. However, as explained in more detail hereafter, the signals that are fed through the relay $SW_1$ to the filter $F_1$ while the relay is closed, continue to act while the relay is open thereby maintaining the bias on the grid $g_1$ during the pulse intervals at a value established by the action of the amplifier $A_1$ during the interval while the relay $SW_1$ is closed.

As explained hereinabove, the timing control unit $S_7$ produces a current periodically in the output of the first relay control amplifier $D_1$. This current is impressed upon the solenoid of the first relay $SW_1$ in order to close the D.C. feedback circuit $X_1$ for a short interval of time in the dark intervals between successive pulses. As indicated by graph $H_2$ of FIG. 3, relay $SW_1$ is closed for a period of 2 millisec. at the beginning of the third quarter of the dark intervals. With this arrangement, the voltage appearing at the output of the preamplifier $A_1$ is sampled periodically during the dark intervals and while the relay $SW_1$ is closed, thereby charging the condenser $C_4$ to the voltage necessary to maintain the bias on the grid $g_1$ at or very near the value at which it was preset initially, as established by the resistors $R_3$ and $R_4$ and the battery $B_0$.

It will be noted that the charging time of the condenser $C_4$ is very short, being established primarily by the value of resistor $R_3$ and the internal output resistance of the amplifier $A_1$. In practice, it is desirable to establish the charging time of condenser $C_4$ at a value that is about 1 millisec., that is, about one-half the time interval during which the relay $SW_1$ is closed. However, it will be noted that when the relay $SW_1$ is open, the charge on condenser $C_4$ is retained for an indefinite period and, more particularly, for a period which is very long compared with the period of revolution of the motor $M_1$. As a result, low frequency components of noise below about $\tfrac{1}{2}$ c.p.s. that appear at the output of preamplifier $A_1$ and charge the condenser $C_4$ of the filter periodically during the dark intervals, are fed back to the input both during the dark and light intervals. Accordingly, the relative amplitudes of those low-frequency components in the output of preamplifier $A_1$ are reduced during the pulse intervals compared with the average amplitude of the signals. In effect, it will be noted that the drift of the amplifier is reduced and the signal-to-noise ratio is increased at such low frequencies.

The above-described gain characteristics may be obtained by setting the constants of the circuit elements at the following values:

$C_1 = 0.01$ μf.
$C_2 = 1.2$ μμf.
$C_3 = 10$ μμf.
$C_4 = 0.25$ μf.
$C_5 = 0.05$ μf.
$C_6 = 141$ μμf.
$R_1 = 100$ megohms
$R_2 = 1000$ megohms
$R_3 = 3,300$ ω
$R_4 = 220,000$ ω
$R_5 = 3,300$ ω
$R_6 = 1$ megohm
$R_7 = 1$ megohm
$R_{10} = 60,000$ ω
$R_{11} = 12,000$ ω

$$\mu_1 = -16.5 \times \frac{(p + 3.1 \times 10^4)(p + 2.5 \times 10^5)}{(p + 640)(p + 10^4)}$$

$B_0 = 140$ volts

In this equation $p$ is the Heaviside operator $$p = j\omega = \frac{d}{dt}$$

where $$j = \sqrt{-1}$$

The characteristic $\mu_1$ is merely one of many that represents the characteristics of amplifiers from D.C. to 150,000 c.p.s. which may be employed without danger of oscillating in this circuit and still has adequate amplification. The values of circuit elements of the D.C. amplifier represented by the characteristic $\mu_1$ may be synthesized by the use of minimum phase networks by well known means. In a circuit having the foregoing characteristics, the voltage pulses developed by the phototube current passing through the resistor $R_1$ are amplified by a factor of about 6.

With the arrangement described above, any long-term instability of the amplifier, and particularly any fluctuations that would occur at a frequency less than about ½ c.p.s. are highly attenuated and rendered substantially ineffective to produce any drift at the output of the preamplifier $A_1$. Furthermore, the effects of random noise generated in the phototube and in the resistor $R_1$ are reduced. Thus the zero level established at the output of the amplifier $A_1$ is maintained within narrow limits both during dark intervals and during pulse intervals, even though the characteristics of the amplifier $A_1$ and the phototube 46 may be changing slowly, such as may occur, for example during the warm-up period of the cathode of the input pentode or due to the aging of the pentode and the phototube.

*Part 6.—Driver Amplifier Stage*

As mentioned hereinabove, the output of the preamplifier stage $S_1$ is applied to the input of the driver amplifier stage $S_2$ through a potentiometer comprising resistors $R_8$ and $R_9$. This potentiometer is employed for adjusting the sensitivity of the spectrophotometer as a whole. Such adjustments may be desired for example to compensate for changes that are made in the width of exit slit 36 of the monochromator 20 to vary the revolving power. This adjustment may be made with the spectrometer operating.

The driver amplifier stage $S_2$ is of a design that is similar to that of the preamplifier stage $S_1$ in that it also is designed to have a high degree of stability at all times and to produce at its output a signal of very nearly zero voltage when no radiation pulses are being applied to the photocell 46. However, by virtue of the much higher degree of stability obtained in the driver amplifier stage $S_2$ and the stabilization obtained in the preamplifier stage $S_1$, the zero-level signal appearing at the output of driver amplifier stage $S_2$ is maintained less than 1% of 1% of the amplitude of the maximum signal produced at the output corresponding to 100% transmission coefficient of a sample in test cell 44. As explained more fully hereinbelow this high degree of stability and, hence, high accuracy of results is obtained by employing a high gain D.C. amplifier in the automatic bias control circuit $X_2$.

Signals from the output of preamplifier $A_1$ are supplied from the potentiometer $R_8$ through resistor $R_{12}$ and coupling condenser $C_{11}$ to the control grid $g_2$ of the input pentode $T_2$ of a D.C. driver amplifier $A_2$. In its pass band, the gain of the amplifier $A_2$ without feedback is very high, being for example $$\mu_2 = 100,000$$

Four feedback paths exist between the output and the input of the driver amplifier $A_2$ in order to assure satisfactory operation, the various feedback paths serving somewhat different functions but cooperating to increase the accuracy of the readings.

One feedback path includes a capacitor $C_{13}$ connected between the output and the control grid $g_2$ and an input capacitor $C_{12}$ connected between the control grid $g_2$ and ground. The feedback by this path is about one-half, so that the effective gain of the driver amplifier $A_2$ is very low, being about two, for very high frequency components above 1200 c.p.s. of signals impressed upon the input. Capacitors $C_{12}$ and $C_{13}$ also assist in preventing the driver amplifier $A_2$ from oscillating.

A second feedback path that operates in the range that includes frequencies of components present in the pulses (that is in the range from 30 c.p.s. to about 1200 c.p.s.) is established by feedback resistor $R_{18}$ connected between the output and input of amplifier $A_2$. This feedback loop is similar to that provided by the resistors $R_{10}$ and $R_{11}$ of the preamplifier stage $S_1$. In this case the feedback ratio is about $$\beta = \frac{1}{10}$$

so that the gain of the driver amplifier stage so far as the amplification of pulses and their main components is concerned is about 10.

An automatic bias control circuit $X_2$ comprising third and fourth feedback circuits is employed to regulate the zero level of signals appearing at the output of the driver stage $S_2$.

The third feedback path is through a second relay $SW_2$, a first stage of low pass filter $F_2$, a first cathode-follower stage $A_5$, a filter $F_3$, a second cathode-follower stage $A_4$, a filter $F_4$, and a resistor $R_{33}$. This feedback path operates on the same principles as the automatic bias control circuit $X_1$ of preamplifier stage $S_1$ if the fourth feedback path is overloaded. Otherwise, it is effective only over a frequency range above about 1 c.p.s. The fourth feedback path is through the second relay $SW_2$, the low pass filter $F_2$, a high-gain D.C. amplifier $A_3$, the filter $F_3$, a cathode follower stage $A_4$, the low-pass filter $F_4$, and the resistor $R_{33}$. This feedback path also acts on the same principles as the automatic bias control circuit, of preamplifier stage $A_1$, except however that the D.C. amplifier $A_3$ regulates the zero level within much closer limits.

Both the third and the fourth feedback paths sample the output of driver amplifier $A_2$ periodically during a portion of the dark intervals by means of the periodically operating relay $SW_2$. Like the first relay $SW_1$, the relay $SW_2$ which has normally-open contacts, is also controlled by the current developed at the output of the first relay control amplifier $D_1$, thus relay $SW_2$ closes for a short interval of time at the same time as the first relay $SW_1$, and remains open the rest of the time as indicated in the graph $H_2$ of FIG. 3.

The low-pass filter $F_2$ is of ladder-type and comprises series resistors $R_{19}$, $R_{20}$, $R_{21}$, and $R_{22}$ connected in the order named between the input and the output thereof and also comprises shunt capacitors $C_{14}$, $C_{15}$, and $C_{16}$ connected between the junctions of successive pairs of series resistors and ground. This filter which has a noise-equivalent pass-band of 0.67 c.p.s., reduces the noise content of the signal applied to the input of the D.C. amplifier $A_3$. Unless such filtering action is employed, high frequency noise between about 1 c.p.s. and 1200 c.p.s. could overload amplifier $A_3$ rendering it ineffective at low frequencies below about 0.67 c.p.s.

The third feedback path operates to reduce the noise in the output of the driver amplifier $A_2$. In the specific example considered herein, this feedback path has a band-pass filter characteristic that renders it very effective to feed back components of noise in decreasing amounts beginning at about 1 c.p.s. and up to about 15 c.p.s. Above that point the second feedback path assumes control. By its feedback action, the third feedback path attenuates the higher frequency components of noise below about 15 c.p.s. These attenuated components, which appear in the output of driver amplifier $A_2$ are still further attenuated as they pass through the filter $F_2$ to the D.C.

amplifier $A_3$. Thus by the action of the third feedback path, the amplitude of the frequency components of the noise above about 1 c.p.s. are reduced, so that a lower demand is made upon the filtering action required by filter $F_2$ to prevent overload of the D.C. amplifier $A_3$. This is particularly advantageous in the present instance, since as explained hereinafter, the D.C. amplifier $A_3$ is of a type which chops the signal applied thereto, amplifies the chopped signal, and then reconverts the amplified chopped signal into a D.C. voltage that is fed back to the input of driver amplifier $A_2$.

More particularly, the D.C. amplifier $A_3$ includes at its input a vibrator $SW_3$ that is operated at 60 c.p.s. This vibrator is connected in the input of a high-gain A.C. amplifier $A_3'$ and operates to alternately connect the output of the low-pass filter $F_2$ to the input of the A.C. amplifier and to ground sixty times each second. Thus, a 60-cycle square-wave signal having an amplitude equal to that of the D.C. voltage appearing at the output of the low-pass filter $F_2$ is impressed upon the input of the A.C. amplifier $A_3'$. This signal, it will be noted, contains noise that appears at the output of the filter $F_2$, and also components of 60 c.p.s. and higher created by the opening and closing of the relay $SW_3$. The output of the A.C. amplifier $A_3'$ is passed through a transformer $T_3$ to a synchronous rectifier that transforms the amplified square-wave pulses into a D.C. voltage. The rectifier may be in the form of a vibrator $SW_4$ that is connected across the secondary winding of the transformer and that is operated in synchronism with the vibrator $SW_3$ at the input of the A.C. amplifier $A_3'$. A low-pass filter in the form of a resistor $R_{23}$ shunted by a condenser $C_{17}$ is connected between the moving arm of the output vibrator $SW_4$ and the center tap of the secondary winding of the transformer $T_3$ to produce the desired D.C. control voltage. As mentioned hereinabove the output of the D.C. amplifier $A_3$ is transmitted through low-pass filter $F_3$, cathode follower stage $A_4$, and low-pass filter $F_4$, to the input of the driver amplifier $A_2$.

It is desirable to employ as much gain as possible from the output to the input of driver amplifier $A_2$ at D.C. in order to minimize drift of zero-level, but attenuation at about 0.01 c.p.s. and higher is desirable to prevent signals of 60 c.p.s. and its harmonics due to the action of the vibrators $SW_3$ and $SW_4$ from reaching the input of the driver amplifier $A_2$ and being amplified thereby. Such attenuation is provided by the filters $F_3$ and $F_4$. These filter reduce the feedback ratio in the fourth feedback path to below unity for components of 1 c.p.s. and higher.

More particularly, the cathode follower stage $A_5$ includes a triode having the control grid at its input connected to the junction between the first two series resistors $R_{19}$ and $R_{20}$ of the low-pass filter $F_2$. The cathode of the cathode follower stage $A_5$ is connected to the negative power supply terminal $B_0$ through resistors $R_{24}$ and $R_{25}$, the second resistor being in the form of a potentiometer having a moving contact which is connected to one end of the filter resistor $R_{23}$, the other end of which is connected to the input of filter $F_3$. The floating cathode itself is connected to another point of the filter $F_3$ as explained in detail hereinafter.

The potentiometer $R_{25}$ is adjusted to such a point as to set the output of A.C. amplifier $A_3'$ at about zero. In this case the input of the driver amplifier $A_2$ is established at such a value that substantially no voltage appears at the output of the driver amplifier. In practice, the adjustment is not critical, and is provided only as a refinement, to compensate for large changes of bias voltage, such as might for example be required if the tube $T_2$ is replaced.

The filter $F_3$ comprises a resistor $R_{26}$ and a capacitor $C_{18}$ connected in parallel and forming a first series impedance thereof. A second series impedance in the form of a resistor $R_{27}$ is connected between the first series impedance and the control grid of the cathode follower stage $A_4$. A shunting impedance comprising two branches is connected between the two series impedances and the cathode of the cathode follower stage $A_5$, one of the branches consisting of a condenser $C_{19}$ and the other comprises a resistor $R_{28}$ and a condenser $C_{20}$ connected in series. A second shunt impedance comprising a resistor 29 and a condenser $C_{21}$ is connected between the output of the filter $F_3$ and the cathode of the cathode follower stage $A_5$.

The cathode follower stage $A_4$ includes a cathode resistor $R_{30}$ connected between the cathode and the negative power supply terminal $B_0$. This cathode follower isolates the filter $F_3$ from the filter $F_4$.

The low-pass filter $F_4$ includes a series resistor $R_{31}$ and a shunt capacitor $C_{22}$ connected at its output.

It will be noted that the capacitor $C_{22}$ connects one end of resistor $R_{33}$ to ground so that this resistor constitutes the input impedance of the driver amplifier $A_2$ for frequencies necessary to the transmission of the pulses and their main components.

The third feedback circuit acts to reduce overload of the A.C. amplifier $A_3'$ in the event that any sudden overloads appear in the output of the amplifier $A_2$. The circuit constants of the system are so chosen that the third feedback circuit acts very quickly so that disablement of the A.C. amplifier $A_3'$ for an excessive period is avoided especially when the system is first put in operation.

In order to attain stable negative feedback action with this amplifier and in order to achieve other desired results, the various circuit elements may be given values set forth in the following tabulation:

$R_8 = 25,000\ \omega$
$R_9 = 1,200\ \omega$
$R_{12} = 300,000\ \omega$
$R_{18} = 3.0$ megohms
$R_{19} = 330\ \omega$
$R_{20} = 100,000\ \omega$
$R_{21} = 100,000\ \omega$
$R_{22} = 33,000\ \omega$
$R_{23} = 68,000\ \omega$
$R_{24} = 5,000\ \omega$
$R_{25} = 100,000\ \omega$
$R_{26} = 1$ megohm
$R_{27} = 5.6$ megohms
$R_{28} = 82,000\ \omega$
$R_{29} = 330,000\ \omega$
$R_{30} = 100,000\ \omega$
$R_{31} = 56,000\ \omega$
$R_{32} = 1,000\ \omega$
$R_{33} = 270,000\ \omega$
$C_{12} = 47\ \mu\mu\text{f.}$
$C_{13} = 47\ \mu\mu\text{f.}$
$C_{14} = 0.22\ \mu\text{f.}$
$C_{15} = 2.0\ \mu\text{f.}$
$C_{16} = 2.0\ \mu\text{f.}$
$C_{17} = 1.0\ \mu\text{f.}$
$C_{18} = 0.1\ \mu\text{f.}$
$C_{19} = 0.036\ \mu\text{f.}$
$C_{20} = 10\ \mu\text{f.}$
$C_{21} = 2.0\ \mu\text{f.}$
$C_{22} = 2.0\ \mu\text{f.}$ In addition to the foregoing specification, the amplifier sections of the cathode follower stages $A_4$ and $A_5$ may be formed by the sections of a twin triode such as type 12AT7, operated with 200 volts on the anodes and the gain of the D.C. amplifier A, was approximately 1,000 at about 60 c.p.s.

Also, in addition, for satisfactory operation, the characteristics of the driver amplifier $A_2$ itself were so chosen that its transfer ratio was $$\mu_2 = -4.4 \times 10^5 \times \frac{(p + 8 \times 10^4)(p + 1.5 \times 10^6)}{(p + 150)(p + 10^4)(p + 3.5 \times 10^5)}$$

Such an amplifier may be readily designed by the use of minimum phase-shift networks.

With the driver amplifier stage $S_2$ designed and arranged as described above, it is possible to stabilize the zero level in the output of the driver amplifier $A_2$ to a value which is less than 1% of 1% of the voltage produced at the output in response to a light pulse supplied by the spectrometer $S_0$. More particularly, with the system described the voltage appearing at the output in response to light pulses of maximum amplitude at the input is about 10 volts and it is possible to stabilize the zero level to a value less than 1 millivolt. The effectiveness of this system is so controlling the zero level or drift, is achieved in part by the periodic action of the second relay $SW_2$ but also in part by virtue of the employment of a high-gain D.C. amplifier in the fourth feedback circuit and the noise-attenuating effects of the third feedback path. Thus, it will be understood, for example, that when the feedback ratio through the fourth feedback path is of a high value such as 1,000, then the effective gain of the driver amplifier $A_2$ for changes in D.C. voltage at the input caused, for example, by drift in the characteristics of the input pentode $T_2$ or by a change in the zero level of the signals applied to its input from the preamplifier stage $S_1$ is the reciprocal of this gain or 0.001. Thus, with this system, any fluctuations in voltage, or drift, occurring below about 1 c.p.s. at the input of the driver amplifier stage are not merely amplified with a low amplification factor as is the case in the preamplifier stage $S_1$, but are in fact highly attenuated.

In order to attain maximum regulation of the zero level, the switches $SW_1$ and $SW_2$ are timed to close toward the end of the dark intervals between pulses. In this way any voltages developed in the amplifiers $A_1$ and $A_2$ by the pulses are permitted to decay to a minimum value before the outputs of these amplifiers are sampled. In the present system they decay by a factor of about 10,000 before the relays $SW_1$ and $SW_2$ are closed. As a result, the sampled output signals that are fed to the automatic bias control circuit comprising the third and fourth feedback circuits are samples of random noise in the system and are free of any systematic errors that might arise if a voltage produced by the signal were also being sampled.

Thus, by the combined action of the preamplifier stage $S_1$ and the driver amplifier stage $S_2$, two alternating series of pulses are produced which are free of any zero-level errors in excess of about 0.001 millivolt. One series of pulses corresponds to the reference sample and has an average amplitude of about 10 volts while the other series corresponding to the test sample under investigation has an average amplitude of $10T$ volts where T is the ratio of the transmission coefficients of the samples at the wavelength under investigation.

The manner in which the average amplitudes of these two sets of pulses are measured and more particularly the manner in which the effects of residual noise existing during the pulse intervals is eliminated, to make this measurement possible, are explained in detail hereinafter.

Part 7.—Comparison Stage

The signals appearing at the output of the driver stage $S_2$ are applied to the comparison stage $S_3$ by connecting the output of the driver amplifier $A_2$ to a sliding contact of a balancing resistor $R_{13}$. One end of the balancing resistor $R_{13}$ is connected through a transmission coefficient resistor $R_{14}$ to ground and the other end of the resistor $R_{13}$ is connected through a compensating potentiometer $R_{15}$ to ground. The transmission-coefficient potentiometer $R_{14}$ is of a highly accurate slide wire construction, such as is sold under the trade mark Helipot, in which the position of the moving arm $N_1$ accurately represents the voltage between the contact of the moving arm on the potentiometer $R_{14}$ and ground. The resistor $R_{15}$ is in the form of a "multi-pot" which comprises a first multiple contact potentiometer $R_{17}$ and a tapped potentiometer $R_{16}$ connected in parallel. Leads from various fixed points on the potentiometer $R_{16}$ are connected to corresponding movable contacts M of the potentiometer $R_{17}$ as explained more fully hereinafter. The purpose of this arrangement is to compensate for the variations of efficiency of transmission of radiation from the monochromator 20 to the photocell 46 through the reference cell 42 and test cell 44 at different wavelengths, so as to compensate for the differences that usually occur in the output of the photocell at different wavelengths even if the same sample material is placed in both cells.

Two relays $SW_5$ and $SW_6$ are connected to the moving contacts $N_1$ and $N_2$ of the corresponding potentiometers $R_{14}$ and $R_{15}$. Upon closure, reference relay $SW_5$ connects the contact $N_1$ of the transmission-coefficient potentiometer $R_{14}$ with an R.C. low-pass filter network $F_5$ comprising a resistor $R_{45}$ and a condenser $C_{25}$. Likewise, upon closure, test relay $SW_6$ connects the contact $N_2$ of the compensation potentiometer $R_{15}$ with an R.C. low-pass filter network $F_6$ comprising a resistor $R_{46}$ and a condenser $C_{26}$.

The second relay control amplifier $D_2$ is connected to reference relay $SW_5$ and operates to close this relay for 5 milliseconds during the center of the reference sample pulse interval and the third relay control amplifier $D_3$ is connected to the reference relay $SW_6$ and is operated to close this relay for a 5 millisecond interval during the middle of the test sample pulse interval. In practice, by employing relays $SW_5$ and $SW_6$ of good design, and by closing them only during the middle 80% of the interval while the entire beam is passing through either window $W_1$ or $W_2$, errors that might otherwise occur because of irregularity in the timing of the closing and opening of the relays or in the motor speed or in the rise or decay of the signals, are eliminated.

Thus, the potentiometer $R_{14}$ is connected to the sample filter $F_5$ and the potentiometer $R_{15}$ is connected to the test sample filter $F_6$ only during the time intervals when the reference sample pulses $P_r$ and the testing sample pulses $P_t$ appear at the output of the driver amplifier stage $S_2$. The time constants of the two filters $F_5$ and $F_6$ are equal and are about equal to the interval between pulses of each series being, in this case, equal to about 12 millisec. Thus during the intervals that the relays $S_5$ and $S_6$ are closed, charges are built up on the condensers $C_{25}$ and $C_{26}$ which correspond to the average amplitude of the pulses during the closure intervals. The outputs of the two filters $F_5$ and $F_6$, which are located at the junction between their respective resistors $R_{45}$ and $R_{46}$ and their respective condensers $C_{25}$ and $C_{26}$, are connected through resistors $R_{47}$ and $R_{48}$ respectively to stationary contacts of a vibrator $SW_7$, the moving arm of which is connected through a blocking condenser $C_{27}$ to the input of the recorder amplifier $S_4$. Though the timing of the operation of the vibrator $SW_7$ is not critical, in the best practice, it produces a square wave that is in phase with the 60 c.p.s. voltage applied to the generator G from the power mains. However, the polarity of the square wave depends on whether the voltage across condenser $C_{25}$ is larger or smaller than that across condenser $C_{26}$.

Part 8.—Recorder

The recorder amplifier stage $S_4$ includes a pen preamplifier $A_6$, a narrow-band-pass filter $F_7$, and a power amplifier $A_7$ connected in the order named between the blocking condenser $C_{27}$ and a split-phase reversible induction motor $M_2$. The preamplifier $A_6$ amplifies the alternating square-wave signal applied to its input by condenser $C_{27}$. The amplified signals appearing at its output have an amplitude that is proportional to the difference in voltages that appear at the output of the reference sample filter $F_5$ and the test sample filter $F_6$. The filter $F_7$ is designed to emphasize 60 c.p.s. components of the wave appearing at the output of the pen preamplifier $A_6$ and to attenuate components of other frequencies, thereby impressing upon the input of the power amplifier $A_7$ an alternating current voltage of corresponding amplitude. Thus, the direction of rotation of the motor $M_2$ depends on the polarity of the voltage applied thereto by power amplifier $A_7$ and its speed is about proportional to that voltage.

The voltage supplied to the reference winding of the motor $M_2$ is in quadrature with the output of amplifier $A_7$.

Both the recorder $S_5$ and the contact $N_2$ of the potentiometer $R_{15}$ are driven by the wavelength control motor $S_6$ so that the recording paper $P_1$ is advanced along its length by a distance which bears a predetermined one-to-one relationship to the wavelength of the radiation that is being focused at the exit slit 36 of the monochromator 20. The sliding contact $N_2$ is also advanced by the wavelength control unit $S_6$ along the length of the potentiometer $R_{16}$, so that each position of the movable contact $N_2$ corresponds to the wavelength of the radiation entering the testing unit 40 at the time. Each of the positions so established corresponds to a voltage at contact $N_2$ that must be matched by the voltage at contact $N_1$ when the contact is set at a 100% point if the transmission coefficient of the test sample at that wavelength is 100%, as explained more fully hereinafter.

The shaft of the motor $M_2$ drives a recording pen $Q_1$ in a direction transverse to the movement of the paper $Q_2$ of a recording.

The recorder motor $M_2$ is also connected to the moving contact $N_1$ of the transmission-coefficient potentiometer $R_{14}$. This connection is so arranged that if the voltage appearing at the output of the test sample filter $F_6$ differs from that appearing at the output of reference sample filter $F_5$, the movable contact $N_1$ is moved in such a direction as to reduce the difference. As a result, the recorder motor $M_2$ is brought to rest in a null position only when the voltage applied to the test sample filter $F_5$ from the transmission-coefficient potentiometer $R_{14}$ is equal to the reference voltage established by the compensation potentiometer $R_{15}$.

The entire automatic null-balancing system comprising the potentiometers $R_{14}$ and $R_{15}$, the relays $S_5$ and $S_6$, the filters $F_5$ and $F_6$ and the recorder amplifier $S_4$ and motor $M_2$ constitutes a servo-mechanism. While many different kinds of servo-mechanisms could be employed for making the desired recordings, we have found it desirable to employ a type which is called a rate servo-mechanism. For this purpose a generator $G$ connected to the output shaft of the recorder motor $M_2$ is employed to develop a voltage which corresponds in amplitude and phase to the speed and direction of rotation of the motor shaft. This voltage is fed back to the input of the filter $F_7$ in phase with the square waves applied thereto from amplifier $A_6$ and is employed to control the damping of the servo-mechanism. The constants of the servo-mechanism are also influenced by the characteristics of the filters $F_5$ and $F_6$. In a practical embodiment of the invention a servo-mechanism has been employed which has a natural period of oscillation of 1 sec. but which is critically damped. This natural period of oscillation, it will be noted, is very long compared to the intervals between successive pulses $P_r$ and $P_t$ and corresponds to a low-pass filter having a pass band of 0.79 c.p.s. Such a system produces a deflection of the recorder pen $Q_1$ that accurately represents the ratio of amplitude of the pulses $P_r$ and $P_t$ in the two series and is relatively free of any detrimental effects of the random noise that appears in the signals representing the pulses $P_r$ and $P_t$ as shown in graph $H_1$ of FIG. 3.

It should be noted that the filters $F_5$ and $F_6$ act as a narrow band-pass filter with a 0 c.p.s. cutoff at the lower side and a 2 c.p.s. cutoff at the upper side and that the vibrator $SW_7$ and capacitor $C_{27}$ act as a differential voltage detector. Other types of narrow band-pass filters could be employed provided only that some other differential voltage detector is employed. Thus, for example, the output of potentiometers $R_{14}$ and $R_{15}$ could be applied alternately by a vibrator operating at 60 c.p.s. to a narrow band-pass filter tuned to 60 c.p.s. and the output of that filter applied to the input of amplifier $A_6$. In this case as in the former the narrow band-pass filter reduces the noise content.

As indicated above, in order that the readings of the recorder shall be accurate even though there may be dissimilarities between the paths over which monochromatic light travels through the reference and sample cells 42 and 44 to the photocell 46 which dissimilarities vary with wavelengths, the compensation potentiometer $R_{15}$ is adjusted to produce the desired compensation. More particularly, it will be noted that if all the moving contacts of the potentiometer $R_{17}$ are set at one point on potentiometer $R_{17}$, the potentiometer $R_{14}$ will have the same potential at all points along its length, but due to the spectral differences in the transmission characteristics of the paths along which light travels to the reference and sample cells, the voltages appearing across the compensation potentiometer $R_{15}$ during the reference-sample pulse intervals would vary. If no account is taken of this fact then, even if the two materials located in the reference-sample and test-sample cells are identical, a record would be produced representing those differences. Then if the test-sample material was different from the reference-sample material, a spectrogram would be produced which contained errors corresponding to those differences.

To avoid these difficulties, the sliding contact of the potentiometer $R_{16}$ is moved along the length of the potentiometer $R_{16}$ under the influence of the wavelength control unit $S_6$. In practice the settings of the moving contacts $m$ are established by successively setting the monochromator 20 at different wavelength positions and moving a corresponding contact that is connected to a corresponding terminal of the resistor $R_{17}$ to such a point that the system indicates 100% transmission-coefficient when samples of identical material are contained in the reference and sample cells 42 and 44. By employing about thirty such contacts, excellent correction can be obtained over a wide wavelength range from about 200 m$\mu$ to about 25,000 m$\mu$. Though the correction is not perfect between the points of connection of the contacts to potentiometer $R_{16}$, the interpolation is not far in error.

Satisfactory operation of the recorder including the servo-mechanism may be obtained by employing circuit elements whose constants have the values indicated by the following table:

$R_{13}$=2,000 $\omega$
$R_{14}$=1,200 $\omega$
$R_{16}$=50,000 $\omega$
$R_{17}$=1,200 $\omega$
$R_{45}$=47,000 $\omega$
$R_{46}$=47,000 $\omega$
$R_{47}$=27,000 $\omega$
$R_{48}$=27,000 $\omega$
$C_{25}$=0.25 $\mu$f.
$C_{26}$=0.25 $\mu$f.
$C_{27}$=0.1 $\mu$f.

In some arrangements, to facilitate making accurate measurements of transmission coefficients of low value as well as those of high value, it is desirable to employ a non-linear transmission-coefficient resistor $R_{14}$. In such a case, in order to maintain uniform rate of response of the servo-mechanism, the gain of the pen preamplifier $A_6$ is varied inversely with the rate of change of transmission coefficient with respect to the position of the pointer $N_1$. Such an arrangement is illustrated in FIG. 7 where there is shown a logarithmic potentiometer $R'_{14}$ and a control from the output of the motor $M_2$ for varying the gain of the pen preamplifier $A_6$. When employing such a system the scale of the record is in absorbance units where $$\text{absorbance} = -\log_{10} T$$

By employing such a logarithmic arrangement the full advantages of this invention may be obtained since both low and high absorbance readings may be made on the record to the same degree of accuracy.

*Part 9.—Operation of the Spectrophotometer*

In considering the mode of operation of the spectrophotometer described above, it is sufficient to consider a case in which a reference sample having 100% transmission coefficient throughout the spectral range of interest is placed within the reference-sample cell 42, and a test sample that has a transmission coefficient T that varies with wavelength λ in the same spectral region of interest is placed in the test-sample cell 44 and with the source of radiation, the amplifiers and the other parts of the equipment suitably energized operation of the wavelength control unit $S_6$ is initiated, sweeping the spectrum of radiation past the exit slit 36 at a predetermined rate, thus causing monochromatic radiation of changing wavelength to be projected into the testing unit 40 and through the reference and sample cells 42 and 44 to the common photocell 46. As the shutter rotates, a beam of light is alternately transmitted in pulses through the reference sample and through the test sample so that two alternate series of separate pulses of light strike the photocell 46. During this action, as explained above, the intensity of radiation falling on the photocell fluctuates in a random statistical manner because of the discrete or corpuscular nature of light and noise occurs spontaneously in the photocell. The signals, comprising the two series of alternating pulses, together with the noise that is superposed upon them both during the pulse intervals and during the dark intervals, appear across input resistor $R_1$ and are amplified by a small amount, such as 6 by preamplifier $A_1$ thereby appearing at the output of preamplifier $A_1$ in a low impedance circuit which permits the signals to be carried by cables, if desired, to a remote point where other parts of the recording spectrophotometer are located. As the signals are transmitted through the preamplifier stage $S_1$, relay $SW_1$ is closed periodically during the dark intervals for a fraction of those intervals in the intermediate portion thereof. As a result of this action, the bias of the preamplifier $A_1$ is set at such a point that the output of the preamplifier is maintained substantially zero during the dark intervals and also maintaining the zero level during the pulse intervals at a point which is very nearly zero.

A fraction of the output of the preamplifier stage $S_1$ as determined by the setting of the potentiometer $R_8$ is applied to the input of the driver amplifier stage $S_2$. The signals are amplified by the driver amplifier stage and then impressed on the comparator stage where the difference in the average amplitudes of the pulses in the two series is detected and employed to control a servo-mechanism that indicates at its output the transmission coefficient of the test sample.

As the waves pass through the driver stage amplifier $S_2$, the relay $SW_2$ operates periodically for a short interval of time in a portion of the dark intervals between the ends thereof to produce voltages that are fed back to the input of the preamplifier $A_2$ to control its bias so accurately that the average amplitude of the D.C. voltage appearing at the output of the driver amplifier $A_2$ during the dark intervals is only about 1.0 millivolt and does not vary by more than 1.0 millivolt from an absolute zero value. The effectiveness of the bias control circuits in the driver amplifier stage $S_2$ will be appreciated when it is realized that this means that the bias at the grid of the input pentode $T_2$ is maintained constant on the average within limits of ±0.01 microvolt in the specific system described herein. Furthermore, the zero level at the output of the driver amplifier stage $S_2$ that exists while the pulses are being amplified is also less than 1.0 millivolt. As explained hereinabove, the effectiveness of the bias control circuit of the driver amplifier stage $S_2$ to maintain the zero level of the signals applied to the comparison stage $S_3$, is enhanced by the employment of a bias control circuit in the preamplifier stage $S_1$.

As the wavelength of the radiation entering into the testing unit 40 from the monochromator 20 varies, the paper of the recorder $S_5$ is drawn past the recording pen $Q_1$. The position of the recording pen along the distance of the paper moved from some starting position always corresponding to the wavelength of radiation being transmitted through the sample cells 42 and 44. As the wavelength changes the servo-mechanism automatically adjusts the position of the moving contact $N_1$ to turn the motor $M_2$ to a position in which the voltage appearing at the moving contact $N_1$ equals that produced at the moving contact $N_2$. In the embodiment of the invention described herein satisfactory operation has been obtained by employing spectrum sweep rates of from 0.05 mμ/sec. to 50 mμ/sec., depending upon the resolving power and accuracy required and also the rate of change of transmission coefficient with wavelength. It will be noted that at each wavelength during the intervals when the test sample relay $SW_6$ is closed, the voltage appearing across the potentiometer $R_{16}$ is proportional to the amplitude of the pulses $P_t$ that have been affected by the test sample. It will also be noted that at each wavelength during the intervals when the reference sample relay $SW_5$ is closed, the voltage appearing across the transmission-coefficient potentiometer $R_{14}$ is similarly proportional to the amplitude of the pulses $P_r$ that have been affected by the reference sample. Accordingly, if the compensation potentiometer $R_{15}$ has been properly set by employing either a linear or calibrated slide wire potentiometer $R_{14}$, the position of the moving contact $N_1$ always indicates the percentage transmission-coefficient of the test sample. If desired, this transmission-coefficient may be indicated on a scale adjacent the moving contact $N_1$ or may be read directly from the record made by the recording pen $Q_1$. By virtue of the fact that the record is moved along its length and that the pen is moved transversely thereto by amounts that correspond to the transmission-coefficient of the test sample at different wavelengths, a spectrogram is recorded. This spectrogram is very accurate since the transmission coefficients are free of large errors that might otherwise arise due to variations in the zero level upon which the pulses appear. It will be noted that even if the zero level is not zero but is set somehow at some fixed amount different from zero, with the system described herein that zero level is substantially constant. For this reason, even if a zero level different from zero is present, accurate results may be obtained by suitable calibration of the instruments.

In order that the measurements may be accurate throughout the entire wavelength range of the spectrum in which the analysis is being made the wavelength control unit rotates the prisms 27 and 34 at such a rate that the displacement of the recording pen $Q_1$ reaches 99% or more of its ultimate value when the transmission coefficient changes abruptly from one value to another and returns to its original value over a small range dλ. Thus, if dλ is the resolving power of the spectrometer and dt is the natural frequency of the recording system the rate of change of λ as the beam is swept across the exit slit should be less than $$\frac{d\lambda}{dt}$$

to achieve the desired accuracy.

It is to be understood that many problems arise in the practice of spectroscopy which vary somewhat from those referred to specifically in the above specification and that corresponding variations in test procedures may be adopted in order to solve those particular problems. Basic principles that are involved in the solution to these problems in accordance with this invention will, however, be the same as those hereinabove set forth and the variations that may be necessary therein in order to apply these principles to special problems will be apparent to those skilled in the art from the foregoing disclosure.

Furthermore, though the invention has been described with particular reference to its application to spectrophotometry, it will be understood that it may also be applied to other systems in which it is desired to measure or compare pulses.

It is, therefore, to be understood that though only one embodiment and application of the invention has been specifically described herein the invention may be embodied in many other forms within the scope of the appended claims.

We claim:

1. In a photometer for analyzing a sample, a source of light, signal-producing means including a photosensitive element, means including a light chopper driven by a motor for periodically transmitting a series of trapezoidally-shaped pulses of light from said light source to said photosensitive element, the successive light pulses striking the photosensitive element being separated by dark intervals, the intensity of each light pulse rising from a low light level to a high light, dwelling at the high light level, and then falling to said low light level, said low light level existing during said dark intervals, said high level existing for a dwell time that is a large fraction of the period between successive light pulses, means for supporting such sample on a light path between said source and said photosensitive element, a storage circuit having a decay time that is long compared with the intervals between successive light pulses, said storage circuit comprising a storage element, switching means operated by said motor for applying the output voltage signal from said signal-producing means to said storage element for the major portion of the dwell time of each of said voltage pulses and for suppressing the application of the output voltage signal to said storage element at other times, whereby a signal is developed across said storage element in accordance with the average of the high voltage levels of said voltage pulses and free of effects of fluctuations occurring in said output signal when said output signal is at said low voltage level, and means responsive to the signal developed across said storage element.

2. In a photometer in which light is subjected to the influence of a sample to be tested and a series of separate pulses of light are produced, the pulses having amplitudes that vary with an optical coefficient of the sample, a photosensitive element exposed to said pulses of light, means including a shutter for periodically interrupting the transmission of light from said sample to said photosensitive element whereby a series of separate pulses of light impinge upon said element, the pulses gradually increasing in intensity at the beginning of each and gradually decreasing in intensity at the end of each, the pulses having amplitudes that vary with the transmission coefficient of the sample, an amplifier having an input operatively connected to said photosensitive device, said amplifier having an output, noise occurring in said amplifier simultaneously with the application of pulses thereto and also in the intervals between the application of such pulses, a negative feedback circuit connecting said output to said input, said feedback circuit being adapted to make a D.C. connection of said output to said input, means for closing said connection during the intervals between pulses and for maintaining said connection open while pulses are applied to said input, a low pass filter and means for applying the output of said amplifier to said low pass filter only during selected intervals intermediate the beginning and end of said pulses, and means for measuring the voltage appearing in the output of said filter.

3. In a photometer in which light is subjected to the influence of a sample to be tested and a series of separate pulses of light are produced, the pulses having amplitudes that vary with an optical coefficient of the sample, a photosensitive element exposed to said pulses of light, an amplifier having an input operatively connected to said photosensitive device, said amplifier having an output, noise occurring in said amplifier simultaneously with the application of pulses thereto and also in the intervals between the application of such pulses, a negative feedback circuit interconnecting said output to said input, said feedback circuit being adapted to make a D.C. connection between said input and said output, said feedback circuit including a charging condenser, means for periodically opening and closing said connection between said output and said charging condenser, and means for measuring the amplitude of pulses appearing in the output of said amplifier.

4. In a spectrophotometer in which the intensity of a beam of light is subjected to the influence of a sample to be tested and a series of separate pulses of light are produced, the pulses having amplitudes that vary with an optical coefficient of the sample, a photosensitive element exposed to said pulses of light, scanning means for altering the wavelength of the light to which said photosensitive element is exposed, an amplifier having an input operatively connected to said photosensitive device, said amplifier having an output, noise occurring in said amplifier simultaneously with the application of pulses thereto and also in the intervals between the application of such pulses, a negative feedback circuit connecting said output to said input, said feedback circuit being adapted to make a D.C. connection of said output to said input, means for closing said connection during the intervals between pulses and for maintaining said connection open while pulses are applied to said input, and a recorder driven by said scanning means for recording the spectral variation in said coefficient of said sample.

5. In a spectrophotometer in which the intensity of a beam of light is subjected to the influence of a sample to be tested and a series of separate pulses of light are produced, the pulses having amplitudes that vary with an optical coefficient of the sample, a photosensitive element exposed to said pulses of light, scanning means for altering the wavelength of the light to which said photosensitive element is exposed, means including a shutter for periodically interrupting the transmission of light from said sample to said photosensitive element whereby a series of separate pulses of light impinge upon said element, the pulses gradually increasing in intensity at the beginning of each and gradually decreasing in intensity at the end of each, the pulses having amplitudes that vary with the transmission coefficient of the sample, an amplifier having an input operatively connected to said photosensitive device, said amplifier having an output, noise occurring in said amplifier simultaneously with the application of pulses thereto and also in the intervals between the application of such pulses, a negative feedback circuit connecting said output to said input, said feedback circuit being adapted to make a D.C. connection of said output to said input, a variable element in said feedback circuit means for periodically altering said element whereby the effective gain of said amplifier varies periodically, a low pass filter and means for applying the output of said amplifier to said low pass filter only during selected intervals intermediate the beginning and end of said pulses, and a recorder driven by said scanning means for recording the voltage appearing at the output of said filter as a function of wavelength to indicate the spectral variation in said coefficient of said sample.

6. In a photometer in which the intensity of a beam of light is effectively altered periodically by being periodically and alternately subjected to the influence of a sample to be tested and a reference element whereby alternate series of separate pulses of light are produced, the pulses of one series having amplitudes that correspond to the intensity of the beam in the absence of the sample and the pulses of the other series having amplitudes that correspond to the intensity of the beam as altered by the sample, a photosensitive element exposed to said pulses of light, scanning means for altering the wavelength of the light to which said photosensitive element is exposed, an amplifier having an input operatively connected to said photosensitive device, said amplifier having an output, noise occurring in said amplifier simultaneously with the application of pulses thereto and also in the intervals between the application of such pulses, a negative feedback circuit connecting said output to said input, said feedback circuit being adapted to make a D.C. connection of said output to said input, means for closing said connection during the intervals between pulses and for maintaining said connection open while pulses are applied to said input, and means responsive to the amplitudes of alternate pulses appearing in the output of said amplifier for producing a signal indicative of the difference between them.

7. In a photometer in which the intensity of a beam of light is effectively altered periodically by being periodically and alternately subjected to the influence of a sample to be tested and a reference element whereby alternate series of separate pulses of light are produced, the pulses of one series having amplitudes that correspond to the intensity of the beam in the absence of the sample and the pulses of the other series having amplitudes that correspond to the intensity of the beam as altered by the sample, a photosensitive element exposed to said pulses of light, scanning means for altering the wavelength of the light to which said photosensitive element is exposed, an amplifier having an input operatively connected to said photosensitive device, said amplifier having an output, noise occurring in said amplifier simultaneously with the application of pulses thereto and also in the intervals between the application of such pulses, a negative feedback circuit connecting said output to said input, said feedback circuit being adapted to make a D.C. connection of said output to said input, means for closing said connection during the intervals between pulses and for maintaining said connection open while pulses are applied to said input, a pair of low pass filters, and mean for applying the output of said amplifier to said low pass filters only during selected intervals intermediate the beginning and end of said pulses, pulses of one series being applied to one filter and pulses of the other series being applied to the other filter, and a recorder driven by said scanning means for recording ratio of the voltages appearing at the outputs of said filters as a function of wavelength to indicate the spectral variation in the alteration produced by said sample.

8. In a photometer in which the intensity of a beam of light is effectively altered periodically by being periodically and alternately subjected to the influence of a sample to be tested and a reference element whereby alternate series of separate pulses of light are produced, the pulses of one series having amplitudes that correspond to the intensity of the beam in the absence of the sample and the pulses of the other series having amplitudes that correspond to the intensity of the beam as altered by the sample, a photosensitive element exposed to said pulses of light, scanning means for altering the wavelength of the light to which said photosensitive element is exposed, an amplifier having an input operatively connected to said photosensitive device, said amplifier having an output, noise occurring in said amplifier simultaneously with the application of pulses thereto and also in the intervals between the application of such pulses, a negative feedback circuit connecting said output to said input, said feedback circuit being adapted to make a D.C. connection of said output to said input, means for closing said connection during the intervals between pulses and for maintaining said connection open while pulses are applied to said input, a pair of circuits selectively responsive to portions of the pulses in the respective series appearing in the output of said amplifier between the beginning and end of each such pulse for producing voltages proportional to the amplitudes of the pulses in said series, and means controlled by said voltages for indicating the ratio of the amplitudes of the pulses in the respective series.

9. In a photometer in which the intensity of a beam of light is effectively altered periodically by being periodically and alternately subjected to the influence of a sample to be tested and a reference element whereby alternate series of separate pulses of light are produced, the pulses of one series having amplitudes that correspond to the intensity of the beam in the absence of the sample and the pulses of the other series having amplitudes that correspond to the intensity of the beam as altered by the sample, a photosensitive element exposed to said pulses of light, scanning means for altering the wavelength of the light to which said photosensitive element is exposed, an amplifier having an input operatively connected to said photosensitive device, said amplifier having an output, noise occurring in said amplifier simultaneously with the application of pulses thereto and also in the intervals between the application of such pulses, a negative feedback circuit connecting said output to said input, said feedback circuit being adapted to make a D.C. connection of said output to said input, means for closing said connection during the intervals between pulses and for maintaining said connection open while pulses are applied to said input, each of said circuits including low pass filtering means for averaging the amplitudes of many pulses in the respective series whereby the effect of noise occurring during the application of said pulses is attenuated compared with the amplitude of said pulses, and means controlled by said low pass filtering means for indicating the ratio of the amplitudes of the pulses in the respective series.

10. In a photometer in which light is subjected to the influence of a sample to be tested and a series of separate pulses of light are produced, the pulses having amplitudes that vary with an optical coefficient of the sample,
a photosensitive element exposed to said pulses of light,
a first D.C. amplifier having an input operatively connected to said photosensitive device,
said amplifier having an output, noise occurring in said amplifier simultaneously with the application of pulses thereto and also in the intervals between the application of such pulses,
a first negative feedback circuit connecting said output to said input, said feedback circuit being adapted to make a first D.C. connection between said input and said output, said circuit including a first charging condenser,
means for periodically opening and closing the connection between the output of said first amplifier and said first charging condenser,
a second D.C. amplifier having an input and an output, the output of said second amplifier being connected to the input of said second amplifier,
a second negative feedback circuit connecting the latter output to the latter input, said second feedback circuit including a D.C. feedback amplifier and being adapted to make a second D.C. connection from said output and said input,
means for closing the latter connection during the intervals between pulses and for maintaining said latter connection open while pulses are being applied,
and means for measuring the amplitude of pulses appearing in the output of said second amplifier.

11. In a photometer in which the intensity of a beam of light is effectively altered periodically by being periodically and alternately subjected to the influence of a sample to be tested and a reference element whereby alternate series of separate pulses of light are produced, the pulses of one series having amplitudes that correspond to the intensity of the beam in the absence of the sample and the pulses of the other series having amplitudes that correspond to the intensity of the beam as altered by the sample,
a photosensitive element exposed to said pulses of light,
scanning means for altering the wavelength of the light to which said photosensitive element is exposed,
a first D.C. amplifier having an input operatively connected to said photosensitive device,
said amplifier having an output, noise occurring in said amplifier simultaneously with the application of pulses thereto and also in the intervals between the application of such pulses,
a first negative feedback circuit connecting said output to said input, said feedback circuit being adapted to make a first D.C. connection from said output and said input,
means for closing said first connection during the intervals between pulses and for maintaining said feedback connection open while pulses are being applied,
a second D.C. amplifier having an input and an output, the output of said second amplifier being connected to the input of said second amplifier,
a second negative feedback circuit connecting the latter output to the latter input, said second feedback circuit including a D.C. feedback amplifier and being adapted to make a second D.C. connection from said output and said input,
means for closing the latter connection during the intervals between pulses and for maintaining said latter connection open while pulses are being applied,
and means responsive to the amplitudes of alternate pulses appearing in the output of said second amplifier for producing a signal indicative of the difference between them.

12. In a photometer in which the intensity of a beam of light is effectively altered periodically by being periodically and alternately subjected to the influence of a sample to be tested and a reference element whereby alternate series of separate pulses of light are produced, the pulses of one series having amplitudes that correspond to the intensity of the beam in the absence of the sample and the pulses of the other series having amplitudes that correspond to the intensity of the beam as altered by the sample,
a photosensitive element exposed to said pulses of light,
scanning means for altering the wavelength of the light to which said photosensitive element is exposed,
a first D.C. amplifier having an input operatively connected to said photosensitive device,
said amplifier having an output, noise occurring in said amplifier simultaneously with the application of pulses thereto and also in the intervals between the application of such pulses,
a first negative feedback circuit connecting said output to said input, said feedback circuit being adapted to make a first D.C. connection from said output and said input,
means for closing said first connection during the intervals between pulses and for maintaining said feedback connection open while pulses are being applied,
a second D.C. amplifier having an input and an output, the output of said second amplifier being connected to the input of said second amplifier,
a second negative feedback circuit connecting the latter output to the latter input, said second feedback circuit including a D.C. feedback amplifier and being adapted to make a second D.C. connection from said output and said input,
means for closing the latter connection during the intervals between pulses and for maintaining said latter connection open while pulses are being applied,
a pair of circuits selectively responsive to portions of the pulses in the respective series appearing in the output of said second amplifier between the beginning and end of each such pulse for producing voltages proportional to the amplitudes of the pulses in said series,
and means controlled by said voltages for indicating the ratio of the amplitudes of the pulses in the respective series.

13. In a photometer in which the intensity of a beam of light is effectively altered periodically by being periodically and alternately subjected to the influence of a sample to be tested and a reference element whereby alternate series of separate pulses of light are produced, the pulses of one series having amplitudes that correspond to the intensity of the beam in the absence of the sample and the pulses of the other series having amplitudes that correspond to the intensity of the beam as altered by the sample,
a photosensitive element exposed to said pulses of light,
scanning means for altering the wavelength of the light to which said photosensitive element is exposed,
a first D.C. amplifier having an input operatively connected to said photosensitive device,
said amplifier having an output, noise occurring in said amplifier simultaneously with the application of pulses thereto and also in the intervals between the application of such pulses,
a first negative feedback circuit connecting said output to said input, said feedback circuit being adapted to make a first D.C. connection from said output and said input, means for closing said first connection during the intervals between pulses and for maintaining said feedback connection open while pulses are being applied,
a second D.C. amplifier having an input and an output, the output of said second amplifier being connected to the input of said second amplifier,
a second negative feedback circuit connecting the latter output to the latter input, said second feedback circuit including a D.C. feedback amplifier and being adapted to make a second D.C. connection from said output and said input,
means for closing the latter connection during the intervals between pulses and for maintaining said latter connection open while pulses are being applied,
a pair of circuits selectively responsive to portions of the pulses in the respective series appearing in the output of said second amplifier between the beginning and end of each such pulse for producing voltages proportional to the amplitudes of the pulses in said series,
each of said circuits including low pass filtering means for averaging the amplitudes of many pulses in the respective series whereby the effect of noise occurring during the application of said pulses is attenuated compared with the amplitude of said pulses,
and means controlled by said low pass filtering means for indicating the ratio of the amplitudes of the pulses in the respective series.

14. In a photometer in which the intensity of a beam of light is effectively altered periodically by being periodically and alternately subjected to the influence of a sample to be tested and a reference element whereby alternate series of separate pulses of light are produced, the pulses of one series having amplitudes that correspond to the intensity of the beam in the absence of the sample and the pulses of the other series having amplitudes that correspond to the intensity of the beam as altered by the sample,
a photosensitive element exposed to said pulses of light,
scanning means for altering the wavelength of the light to which said photosensitive element is exposed,
a first D.C. amplifier having an input operatively connected to said photosensitive device,
said amplifier having an output, noise occurring in said amplifier simultaneously with the application of pulses thereto and also in the intervals between the application of such pulses,
a first negative feedback circuit connecting said output to said input, said feedback circuit being adapted to make a first D.C. connection from said output and said input,
means for closing said first connection during the intervals between pulses and for maintaining said feedback connection open while pulses are being applied,
a second D.C. amplifier having an input and an output, the output of said second amplifier being connected to the input of said second amplifier,
a second negative feedback circuit connecting the latter output to the latter input, said second feedback circuit including a D.C. feedback amplifier and being adapted to make a second D.C. connection from said output and said input,
means for closing the latter connection during the intervals between pulses and for maintaining said latter connection open while pulses are being applied,
a pair of low pass filters, and means for applying the output of said second amplifier to said low pass filters only during selected intervals intermediate the beginning and end of said pulses, pulses of one series being applied to one filter and pulses of the other series being applied to the other filter,
and a recorder driven by said scanning means for recording ratio of the voltages appearing at the outputs of said filters as a function of wavelength to indicate the spectral variation in the alteration produced by said sample.

15. In a photometer for analyzing a sample.
a source of light,
signal-producing means including a photosensitive element,
means for supporting such sample on a light path between said source and said photosensitive element,
periodically operating light-chopping means for transmitting two alternating series of light pulses from said source to said photosensitive element, the light in one of said series of light pulses being transmitted from the source to said sample and thence to said photosensitive element, and the light in the other series of pulses being transmitted to said photosensitive element without being transmitted to said sample, whereby the amplitude of the light pulses of one series is affected by an optical property of said sample and the amplitude of the light pulses of the other series serves as a reference, successive light pulses that arrive at the photosensitive element being spaced apart in time by dark intervals, the light pulses of the two series occurring alternately and at a regular repetition period, the intensity of each light pulse rising from a low light level to a high light level, dwelling at the high light level, and then falling to said low light level, said low light level existing during said dark intervals, said high light level existing for a dwell time that is a large fraction of the repetition period of the light pulses.
said signal-producing means responding rapidly to the intensity of light falling thereon, whereby said signal-producing means develops at its output an output electrical signal in the form of a succession of electrical current pulses corresponding to the succession of light pulses, the magnitude of the current of each electrical pulse rising from a low electrical signal level to a high electrical signal level, dwelling at the high electrical signal level for such dwell time, and then falling to said low electrical signal level,
a measuring circuit including first and second storage elements,
first switching means operated in synchronism with said light-chopping means for applying the output signal from said signal-producing means to said first storage element throughout the major portions of the dwell times of the electrical pulses corresponding to said first series of light pulses and for suppressing the application of such output signal to said first storage element at other times, whereby a signal is developed across said first storage element proportional to the average amplitude of the light pulses of said first series and free of effects of noise occurring in said dark intervals,
second switching means operated in synchronism with said light-chopping means for applying the output signal from said signal-producing means to said second storage element throughout the major portions of the dwell times of the electrical pulses corresponding to said second series of light pulses, and for suppressing the application of such output signal to said second storage element at other times, whereby a signal is developed across said second storage element proportional to the average amplitude of the light pulses of said second series and free of effects of noise occurring in said dark intervals, and
means in said measuring circuit for comparing the amplitudes of signals developed across said two storage elements.

16. In a photometer for analyzing a sample,
a source of light,
a photosensitive element,
means for supporting such sample on a light path between said source and said photosensitive element,
periodically operating shutter means optically interposed between said source and said photosensitive element for transmitting two alternating series of light pulses from said source to said photosensitive element, the light in one of said series of light pulses being transmitted from the source to said sample and thence to said photosensitive element, and the light in the other series of pulses being transmitted to said photosensitive element without being transmitted to said sample, whereby the amplitude of the light pulses of one series is affected by an optical property of said sample and the amplitude of the light pulses of the other series serves as a reference, successive light pulses that arrive at the photosensitive element being spaced apart in time by dark intervals, the light pulses of the two series occurring alternately and at a regular repetition period, the intensity of each light pulse rising from a low light level to a high light level, dwelling at the high light level, and then falling to said low light level, said low level existing during said dark intervals, said high level existing for a dwell time that is a large fraction of the repetition period of the light pulses, an amplifier having an input operatively connected to said photosensitive element and also having an output, whereby an electrical output signal consisting of first and second alternating series of electrical voltage pulses corresponding to the respective series of light pulses are produced at said amplifier output, the magnitude of the voltage of each electrical pulse of each series rising from a low voltage level to a high voltage level, dwelling at the high voltage level for such dwell time, and then falling to said low voltage level, noise occurring in said amplifier simultaneously with the transmission of light pulses to said photosensitive element and also in the intervals between the transmission of said pulses to said photosensitive element, first and second low pass filters, each having a cut-off period long compared with the repetition period of said two series of light pulses respectively, first switching means operated in synchronism with said shutter means for applying electrical pulses of said first series of electrical pulses to said first low pass filter while the amplitudes of said electrical pulses of said first series are at their high level and for the major portions of their dwell times, and for suppressing application of electrical signals to said first low pass filter at other times, whereby a signal is developed across a first storage element proportional to the average amplitude of the light pulses of said first series of light pulses and free of effects of noise occurring in said dark intervals, second switching means operated in synchronism with said shutter means for applying electrical pulses of said second series of electrical pulses to said second low pass filter while the amplitudes of said electrical pulses of said second series are at their high level and for the major portions of their dwell times and for suppressing application of electrical signals to said second low pass filter at other times, whereby a signal is developed across said second storage element proportional to the average amplitude of the light pulses of a second series of light pulses and free of effects of noise occurring in said dark intervals, and means for comparing the amplitudes of signals developed across said two storage elements.

17. In a photometer, means including a source of light and a light-chopper driven by a motor for transmitting two alternating series of trapezoidally-shaped pulses of light to a photosensitive element along two corresponding paths respectively, the successive pulses striking the photosensitive element being spaced apart in time by dark intervals, the intensity of each light pulse rising from a low light level to a high light level, dwelling at the high light level, and then falling to said low light level, said low light level existing during said dark intervals, said high level existing for a dwell time that is a large fraction of the period between successive light pulses, means for supporting a sample to be tested on one of said two paths, the amplitude of the light pulses of the series of pulses traveling along said one path being affected by an optical property of said sample, the amplitude of the light pulses of the series of pulses traveling along said other path remaining unaffected by the optical property of said sample, the latter amplitude serving as a reference, an amplifier having an input operatively connected to said photosensitive element and having an output, said photosensitive element and said amplifier producing an output current comprising first and second alternating series of electrical pulses corresponding to the respective series of light pulses, the magnitude of the output current periodically rising from a low current level to a high current level, dwelling at the high current level for such dwell time, and then falling to said low current level, said output current being noisy at all levels, the electrical current forming alternate electrical pulses rising to different high current levels that have amplitudes that correspond to the amplitudes of the two corresponding series of light pulses respectively, first and second storage circuits, each having a decay time that is long compared with the intervals between successive pulses of the first and second series respectively, each of said storage circuits comprising a storage element, first switching means operated by said motor for applying the output current from said amplifier to said first storage element for the major portion of the dwell time of the electrical pulses of said first series of electrical pulses and for suppressing the application of the output current from said amplifier to said first storage element at other times, whereby a signal is developed across said first storage element in accordance with the average of the high current levels of said electrical signals of said first series and free of fluctuations occurring in said electrical signals when the electrical signals are at their low level, second switching means operated by said motor for applying the output of said amplifier to said second storage element for the major portion of the dwell time of the electrical pulses of said second series of electrical pulses and for suppressing the application of the output current from said amplifier to said second storage element at other times, whereby a signal is developed across said second storage element in accordance with the average of the high current levels of said electrical signals of said second series and free of fluctuations occurring in said electrical signals when the electrical signals are at their low level, and means for comparing the amplitudes of the signals developed across said two storage elements.

References Cited in the file of this patent

UNITED STATES PATENTS

| | | |
|---|---|---|
| 1,881,336 | Voigt | Oct. 4, 1932 |
| 2,287,808 | Lehde | June 30, 1942 |
| 2,419,852 | Owen | Apr. 29, 1947 |
| 2,451,572 | Moore | Oct. 19, 1948 |
| 2,528,924 | Vassy | Nov. 7, 1950 |
| 2,607,899 | Cary et al. | Aug. 19, 1952 |
| 2,638,811 | Williams | May 19, 1953 |
| 2,647,236 | Saunderson et al. | July 28, 1953 |
| 2,679,010 | Luft | May 18, 1954 |

(Other references on following page)

UNITED STATES PATENTS 2,744,438     Steinhaus et al. _____ May 8, 1956
2,761,350     Hornig _____ Sept. 4, 1956

OTHER REFERENCES

"A Ratio Recording Double Beam Infra-Red Spectrophotometer Using Phase Discrimination and a Single Detector," The Review of Scientific Instruments, Savitzky et al., vol. 21, No. 3, March 1950, pages 203–205.

"A Ratio Recording Double Beam Infra-Red Spectrophotometer with Automatic Slit-Control," Journal of the Optical Society of America, Hornig et al., vol. 40, No. 8, August 1950, pages 497–501 relied on.

"An Automatic Relative-Transmission Attachment for the Beckman Model DU Spectrophotometer," Journal of the Optical Society of America, Kaye et al., vol. 42, No. 8, August 1952, pp. 567–8.